(12) United States Patent
Molins

(10) Patent No.: US 8,048,391 B2
(45) Date of Patent: Nov. 1, 2011

(54) PURIFIER COMPRISING A PHOTOCATALYTIC FILTER

(75) Inventor: Laurent Molins, Souppes sur Loing (FR)

(73) Assignee: Saint-Gobain Quartz S.A.S, Courbevoie (FR)

( * ) Notice: Subject to any disclaimer, the term of this patent is extended or adjusted under 35 U.S.C. 154(b) by 0 days.

(21) Appl. No.: 12/672,136

(22) PCT Filed: Jul. 17, 2008

(86) PCT No.: PCT/FR2008/051357
§ 371 (c)(1),
(2), (4) Date: Aug. 2, 2010

(87) PCT Pub. No.: WO2009/019388
PCT Pub. Date: Feb. 12, 2009

(65) Prior Publication Data
US 2011/0064638 A1     Mar. 17, 2011

(30) Foreign Application Priority Data
Aug. 8, 2007  (FR) ..................................... 07 57000

(51) Int. Cl.
*B01D 53/34* (2006.01)
*B01D 53/74* (2006.01)
*G05B 1/00* (2006.01)

(52) U.S. Cl. ................... 423/210; 423/245.3; 422/105; 422/110; 422/111; 422/121; 422/122; 422/5; 422/168; 422/186.3; 204/157.3

(58) Field of Classification Search .................. 423/210, 423/245.3; 422/105, 110, 111, 121, 122, 422/5, 168, 186.3; 204/157.3
See application file for complete search history.

(56) References Cited

U.S. PATENT DOCUMENTS

| 6,241,856 | B1 | 6/2001 | Newman et al. |
| 6,358,374 | B1 | 3/2002 | Obee et al. |
| 2003/0086831 | A1 | 5/2003 | Horton, III |
| 2004/0175288 | A1 | 9/2004 | Horton, III |
| 2005/0178649 | A1* | 8/2005 | Liedy ....................... 204/157.15 |

FOREIGN PATENT DOCUMENTS

WO  03 037389  5/2003

* cited by examiner

*Primary Examiner* — Timothy Vanoy
(74) *Attorney, Agent, or Firm* — Oblon, Spivak, McClelland, Maier & Neustadt, L.L.P.

(57) ABSTRACT

The present invention relates to a gas purifier containing a filtering media having a photocatalytic action, a system for illuminating said media with UV radiation, a time-delay means or a volatile organic compound analyzer, and a means for automatically adjusting the speed of the gas passing through the media or for adjusting the intensity of the UV illumination, said adjusting being carried out as a function of the time determined by the time-delay means or as a function of the content of a volatile organic compound analyzed by the analyzer.

18 Claims, 9 Drawing Sheets

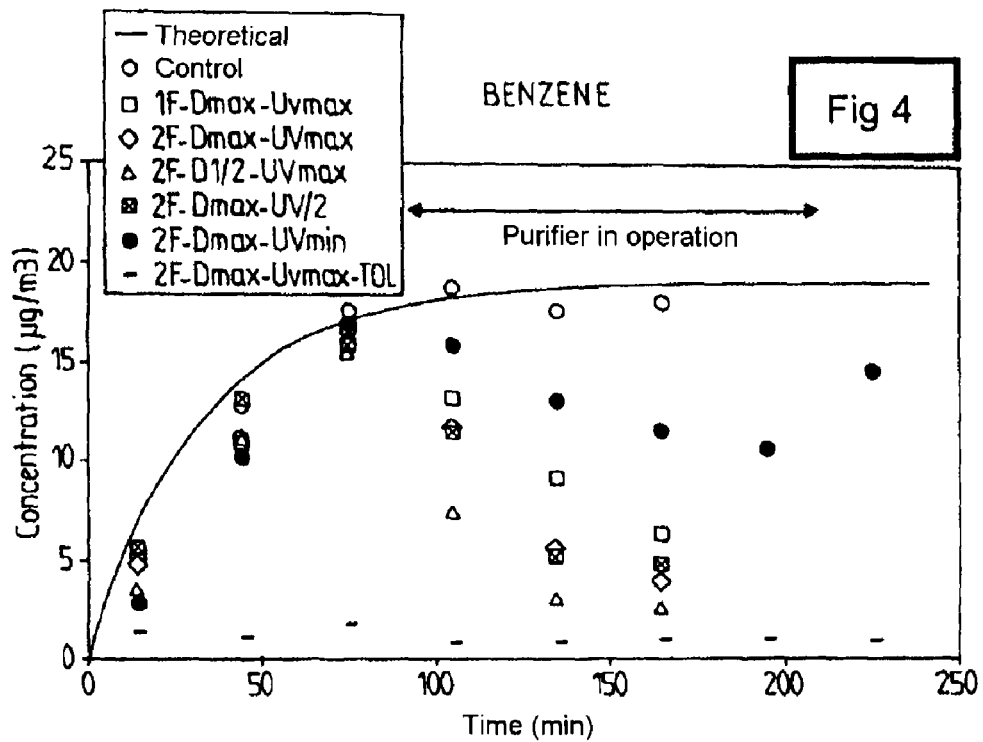
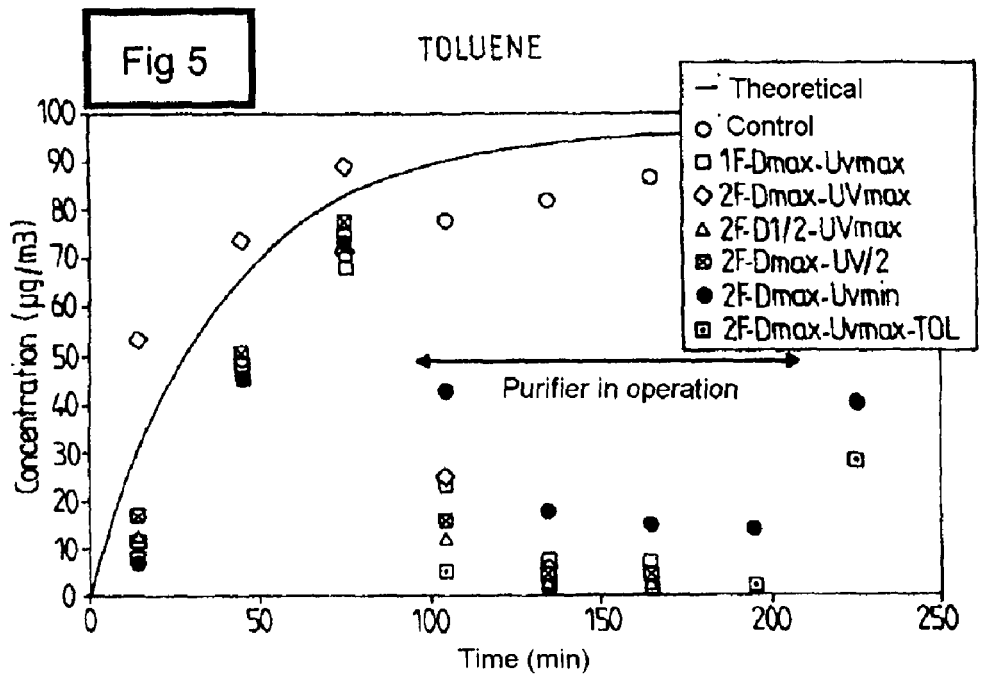

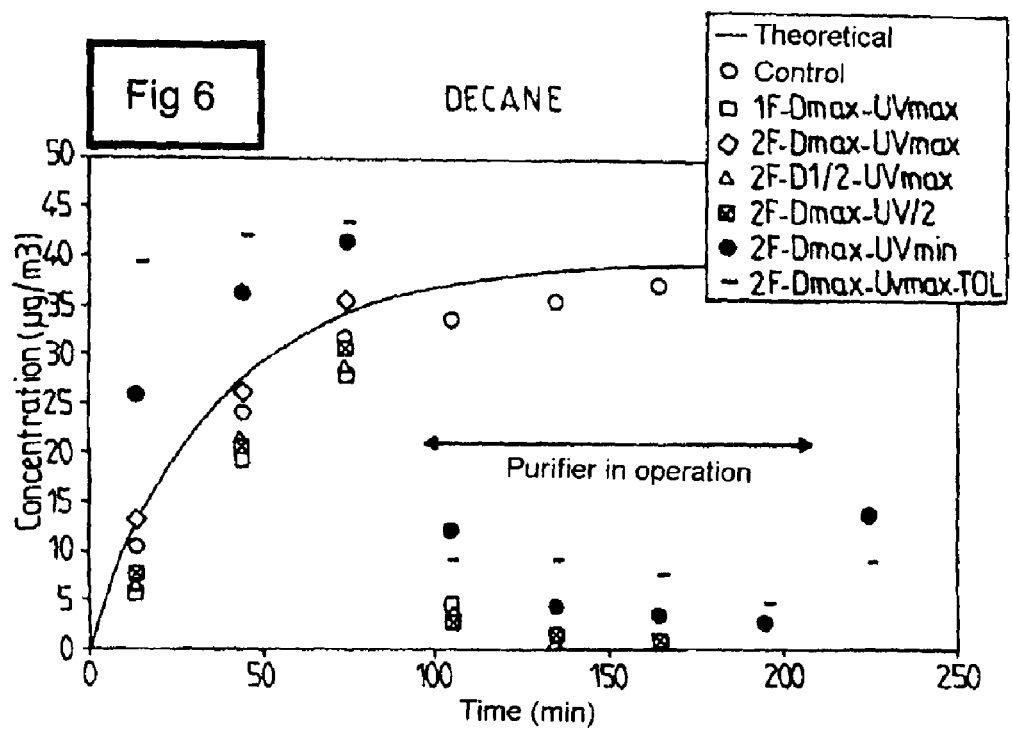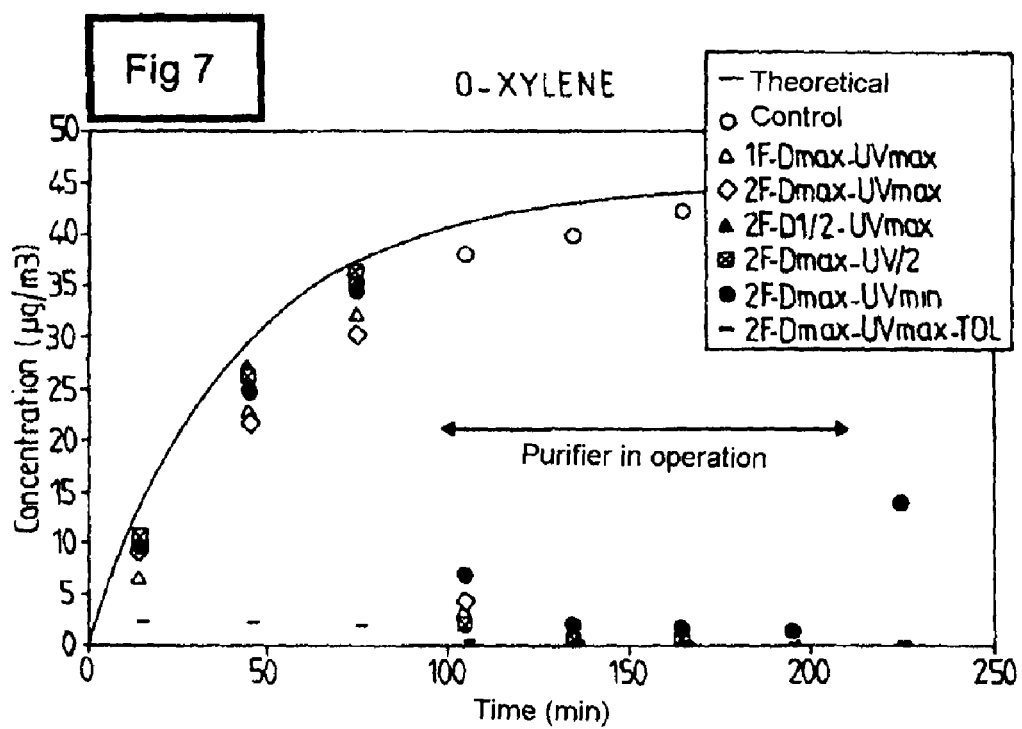

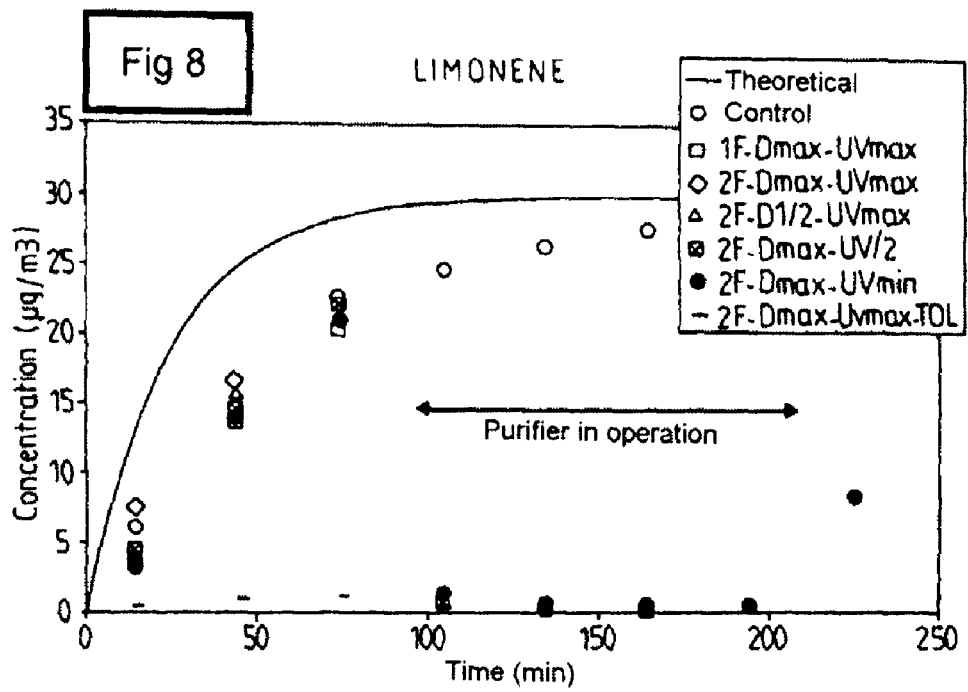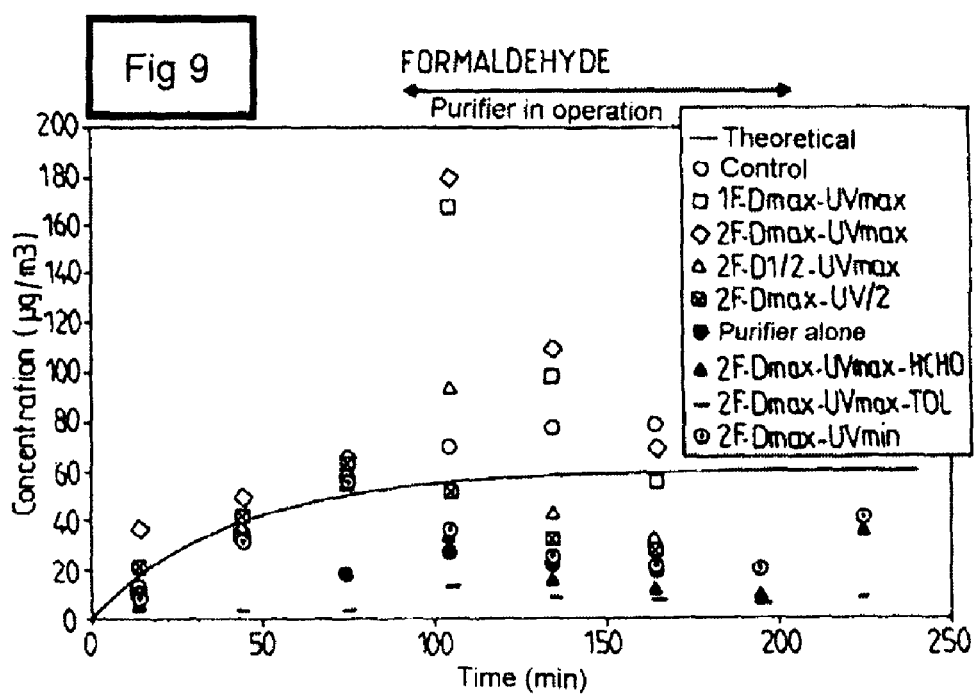

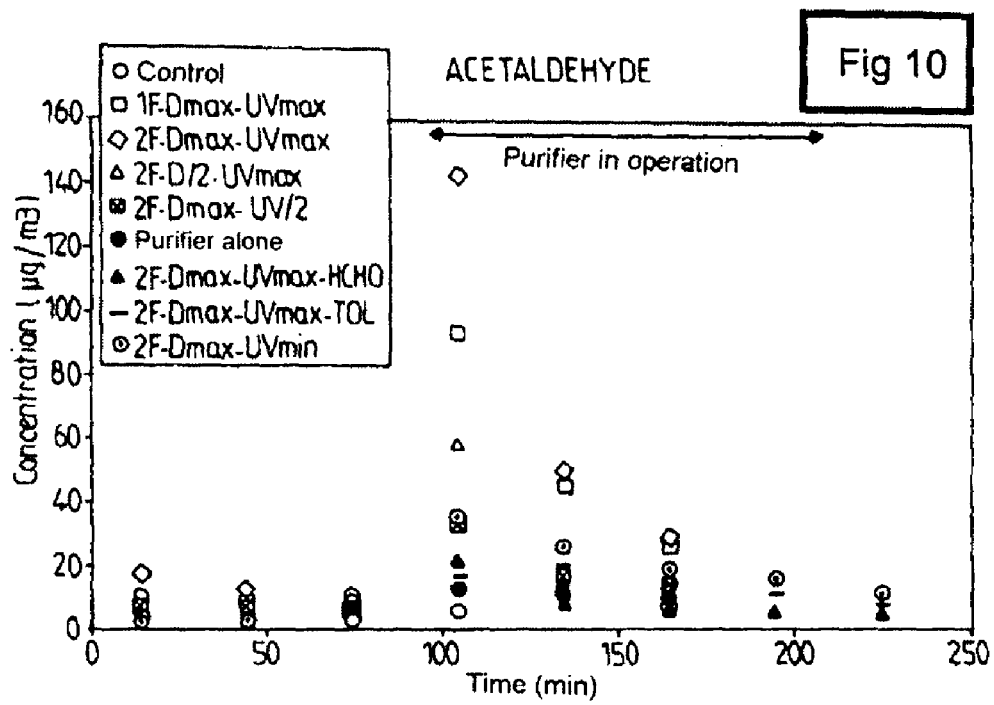
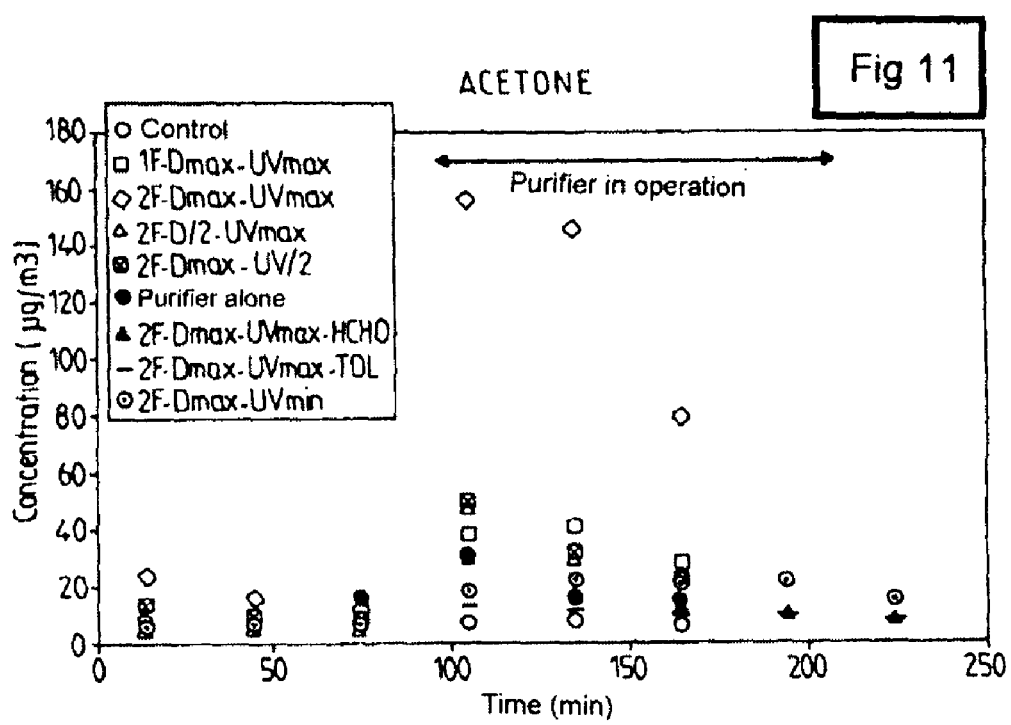

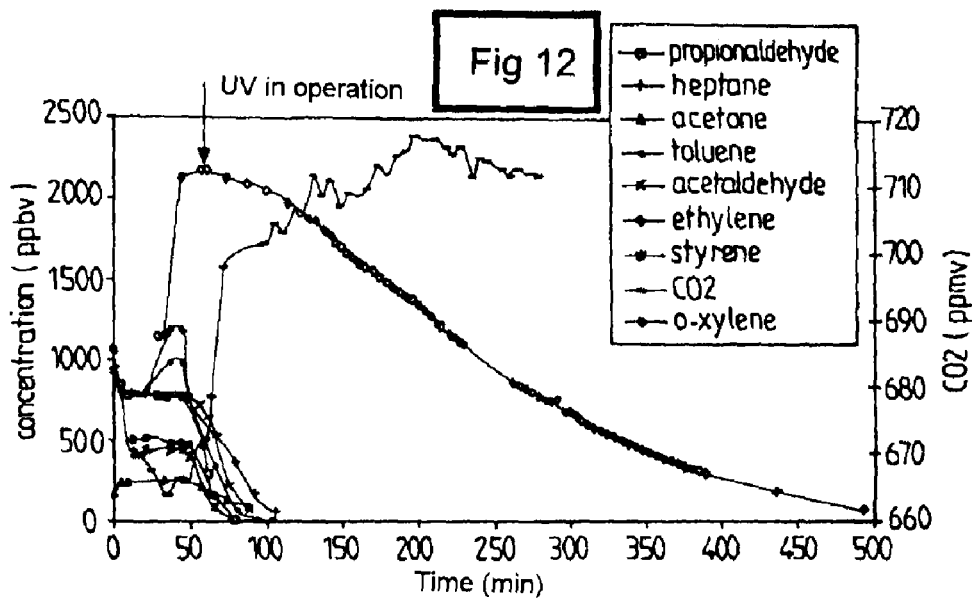
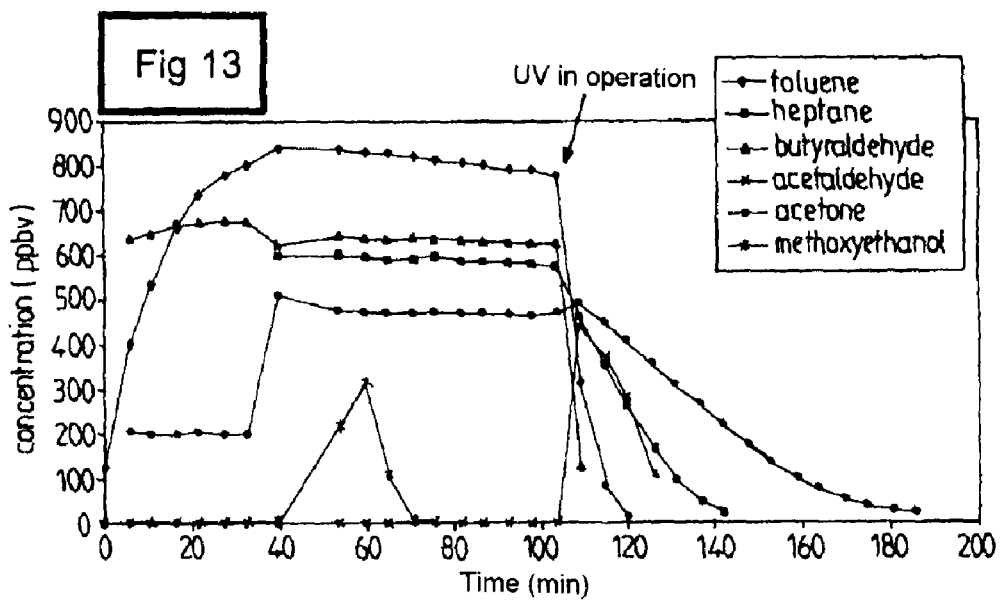

PURIFIER COMPRISING A PHOTOCATALYTIC FILTER

The present application is the U.S. counterpart of WO 2009/019388, the text of which is incorporated by reference, and claims the priority of French Application No. 0757000, filed Aug. 8, 2007, the text of which is incorporated by reference.

The invention relates to a filtering media having a fibrous structure, the fibers of which are coated with a coating having a photocatalytic action, for the purification of ambient air and more particularly the removal of volatile organic compounds present in ambient air.

"Advanced Oxidation" techniques make it possible to oxidize volatile organic compounds (VOCs). The most effective Advanced Oxidation Techniques (AOTs) are those which result in the formation of hydroxyl radicals $OH^-$, which have a greater oxidizing power than that of conventional oxidizing agents. This is the case with heterogeneous photocatalysis. The fundamental principle of the phenomenon is the absorption of a photon by a semiconducting solid, resulting in the is promotion of an electron from the valence band to the conduction band with the release of a hole and thus conferring, on the solid, properties of oxidizing agent and of reducing agent. The majority of volatile organic compounds and also numerous pesticides, herbicides, surfactants and colorants are completely oxidized by this technique to give less toxic products.

A PCO (photocatalytic oxidation) reactor for the purification of ambient air generally comprises a prefilter for trapping dust and particles, a UV source and a PCO filter. The UV source is generally placed between the prefilter and the PCO filter. The air to be purified is generally pulsed or sucked through the PCO filter using a turbine or a fan.

In order to be operational, a PCO filter has to be optimized with regard to the following points:
UV power received,
throughput of the purifier,
rate of passage of the pollutants at the medium,
the inertia of the media and of the PCO coating to the action of UV radiation and hydroxyl radicals,
pressure drop brought about by the PCO media,
limitation on the creation of potentially toxic intermediate compounds, also known under the name of by-products.

In air treatment applications, the design of the various components, fans, sheathing, engine power, is directly related to the pressure drop, which pressure drop depends on the various filtration components of the system, including the PCO media. This point is fundamental both from the viewpoint of the costs of the air treatment units and from its energy operating costs. It is the present inventors who have discovered the importance of the question of the pressure drop generated by the filtering media.

The filters already provided for this type of application often cause an excessively large pressure drop, so that they require the use of fans which are more powerful and greedier for energy. In order to overcome this disadvantage, provision was then made to lower the density of the filter by insertion of components, such as honeycomb, cloth with a high degree of porosity, mosquito screen or ceramic foam, but then true preferential channels were created and the efficiency of the filter for the oxidation of volatile organic compounds was reduced thereby as a result of the small amount of "effective" material in contact with the air stream.

WO 03/010106 teaches the deposition of photocatalytic coating at the surface of silica veils or felts with a specific surface at least equal to 10 $m^2/g$, in particular at least equal to 30 $m^2/g$. This document does not suggest the notion of a low pressure drop combined with a satisfactory efficiency in the targeted application.

Mention may also be made, as documents of the prior art, of U.S. Pat. No. 4,732,879 A1. This document teaches the deposition of a porous catalytic coating on a flexible fibrous substrate composed of glass or ceramic fibers. This document suggests the use of such substrate in filter bag applications.

EP 1 132 133 teaches a photocatalytic reactor made of $TiO_2$ on pure sintered silica. Such a sintering confers high rigidity on the structure, which is not desired as it may be desired to fold it. Furthermore, it is clearly seen, in FIG. 3 of this document, that a high pressure drop is exerted. This is because, at 1 m/second (i.e., approximately 3600 $m^3/h$), the pressure drop is 200 Pa in the best of cases. Such a product is very friable and very brittle, if it is thin. Because of its fragility, it is not possible to reduce its thickness in order to reduce the pressure drop put forward by it.

WO 00/25919 and WO 00/76660 teaches the use of a mat of needled cut yarns as support for a photocatalytic coating. The choice of these fibers requires the use of an organic binder and results in a mat of high density (150 to 600 $g/m^2$). It is not possible with such fibers to have, at the same time, a low density and a low pressure drop.

WO 99/64364 (or EP 1 084 086) teaches an adhesion promoter for photocatalytic coating. This adhesion promoter is organic.

U.S. Pat. No. 6,241,856 teaches a volatile organic compound analyzer and a pump which causes the gas to circulate but which is not under any circumstances under the control of the analyzer. The pump thus does not serve to regulate the gas passing through the purifier according to the result provided by the analyzer.

Mention may be made, as other documents of the state of the art, of U.S. Pat. No. 6,358,374 and WO 03/037389.

BRIEF DESCRIPTION OF THE DRAWINGS

FIG. 4 graphically depicts purification results corresponding to example 24.

FIG. 5 graphically depicts purification results corresponding to example 25.

FIG. 6 graphically depicts purification results corresponding to example 26.

FIG. 7 graphically depicts purification results corresponding to example 27.

FIG. 8 graphically depicts purification results corresponding to example 28.

FIG. 9 graphically depicts purification results corresponding to example 29.

FIG. 10 graphically depicts purification results corresponding to example 30.

FIG. 11 graphically depicts purification results corresponding to example 31.

FIG. 12 graphically depicts purification results corresponding to example 33.

FIG. 13 graphically depicts purification results corresponding to example 34.

Figure 1:
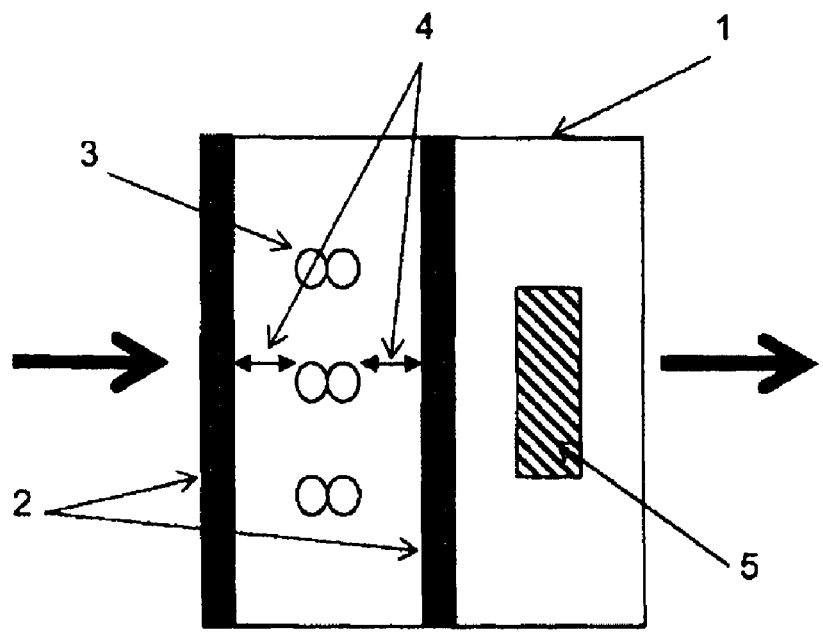
FIG. 1 depicts a purifier of the present invention containing two layers of media.

The invention relates to a stable, essentially mineral, filtering media which is insensitive to UV radiation and to PCO oxidation, this media combining a pressure drop compatible with the requirements of air treatment systems and high effectiveness towards atmospheric pollutants due to its active surface and a PCO effect throughout its volume and not solely a surface effect, as is normally encountered according to the prior art. This filtering media is preferably essentially mineral (i.e. inorganic), which means that its loss on ignition is less than 0.1% by weight and even less than 0.01% by weight, indeed even zero. Such a filtering media can in particular be obtained by the use of a felt produced by stretch-blow molding its fibers, which makes it possible to dispense with the use of binder and even any mechanical uniting action (needling, stitching).

The filtering media according to the invention is obtained after deposition of a coating having a photocatalytic action on a known woven of the felt type.

The invention relates first to a filtering media having a photocatalytic action which has a thickness of at least 2 mm, which is homogeneous and which is devoid of orifice apparent to the naked eye, comprising a felt of mineral fibers, the fibers of which are coated with a coating comprising a catalyst having a photocatalytic action, said felt exhibiting a weight per unit area of between 30 and 80 g/m², said coating representing 5 to 80% of the weight of said media, said media exhibiting a gas pressure drop of less than 150 Pa at 1 m/s in unpleated condition.

The invention also relates to the use of this media in various applications, to its shaping, in order to increase the "frontal" active surface area as much as possible, and to its shaping, in order to reduce the problems of pressure drop as much as possible.

Moreover, the invention relates to a process and to a device for varying the UV intensity and the rate at the substrate at the start of a purifier and/or in the case of a pollution peak, so as to reduce the formation of intermediate reaction compounds which may be toxic.

Finally, other subject-matters of the invention are the applications of the PCO media and of the PCO purifying system in the treatment of gaseous ozone effluents in domestic or industrial interior air atmospheres or alcohol and solvent vapors in industries which are major users of these products (composites, manufacture of fragrance, and the like).

The media according to the invention can be employed to purify the atmosphere of premises for domestic use (dwelling) or premises of the service sector (building containing offices). Generally, use may be made of a felt with a weight per unit area ranging up to 300 g/m². However, the felt used in the context of the present invention, as a result of its weight per unit area of between 30 and 80 g/m², presents a very low pressure drop to the gas passing through it. The felt and the media according to the invention are more suitable for purification in the domestic environment. It should be noted that, for the service or industrial sector, substrates with a greater weight per unit area may be necessary, such as, for example, from 200 to 300 g/m². An alternative for the service and industrial sectors is the use of several media according to the invention placed in series one behind the other. For these sectors, use may also be made of a single filtering media comprising a felt on which has been applied the catalytic coating as explained in the present patent application, except that the felt exhibits a weight per unit area of greater than 80 g/m², for example 80 to 300 g/m². It is also possible to place several of these media in series one behind the other.

The felt to be used as substrate can exhibit a density of less than 30 kg/m³. The felt to be used as substrate generally exhibits a density ranging from 0.5 to 60 kg/m³ and more generally from 1 to 30 kg/m³.

The photocatalytic coating formed according to the invention at the surface of the fibers of the felt which is used as substrate represents from 5 to 80% and generally from 10 to 50% of the weight of the filtering media.

The catalyst having a photocatalytic action generally comprises at least one oxide from the group of the following oxides: $TiO_2$, $ZnO$ and $CeO_2$. It preferably comprises titanium oxide, at least partially crystalline.

The felt is a fibrous structure having mineral fibers. These fibers can be based on silica, such as glass (generally comprising at least 30% by weight of silica, it being possible for the glass to be of the E, C, R, S, D or AR type), washed glass (glass fiber leached chemically and then possibly stabilized thermally, generally comprising more than 90% by weight of silica and in standard fashion between 96% and 99% by weight of silica), of ceramic (mention may be made of fibers based on mullite, of which Unifrax and Thermal Ceramics are well known suppliers, Nextel fibers from 3M or the pure alumina fiber sold under the tradename Saffil) or pure silica (also known as quartz and comprising at least 99% of amorphous $SiO_2$).

Some glass compositions suitable in the context of the present invention are given in table 1 below:

TABLE 1

| | Type E glass | Type C glass | Type AR glass |
| --- | --- | --- | --- |
| $SiO_2$ | 53-55% | 60-65% | 61% |
| $Al_2O_3$ | 14-15% | 3.5-6% | / |
| CaO | 17-23% | 14% | 5% |
| MgO | 1% | 3% | / |
| $Na_2O_3$ | 0.8% | 10% | 17% |
| $B_2O_3$ | 0-8% | 5% | / |
| $Fe_2O_3$ | 0.3% | 0.5% | 0.3% |
| $TiO_2$ | 0.5% | / | / |
| $ZrO_2$ | / | / | 10% |

Use may also be made of the metal fiber (generally based on 316 or 316 L stainless steel, the main suppliers of which are Bekaert and Ugitech). The material used is preferably glass and more preferably silica in order to be as transparent as possible to UV illumination in use, as UV radiation then penetrates better to the core of the filtering media in order to render it more active.

The felt is preferably nonsintered and devoid of organic matter, which is possible in particular by the use of the stretch-blow molding process described below applied to mineral material.

In order to produce a felt of mineral fibers, in particular comprising silica (glass or pure silica), it is possible, for example to proceed by drawing rods of the material under consideration (such as of silica or of glass, as the case may be), with a diameter of generally less than 7 mm, in a burner (in particular oxy-propane burner) in order to bring them to a filament diameter of less than 0.5 mm. This filament can then be drawn again by flame stretch-blow molding in a second burner and thrown onto a surface in forward progression, such as a forwardly progressing belt or a rotating receiving drum. The filaments thus obtained generally have a diameter of less than 50 μm and are optimally centered on 9 μm, for example between 7 and 15 μm. Larger filaments generally cause the felt to lose flexibility. Several tens of filaments can be drawn simultaneously by this process. The drawn material can be of quartz, silica or glass type and more generally any type of heat-fusible mineral material, which includes alumina and mullite. This process for nonwoven (or mat) manufacture by flame stretch-blow molding, followed by throwing onto a surface in forward progression (forwardly progressing belt or rotating receiving drum), results in a particularly homogeneous structure devoid of orifices apparent to the naked eye, even at a very low weight per unit area. This technique produces substantially curled fibers, which means that they naturally unite with one another by intertwining to form a coherent nonwoven mat, without it being necessary to use a binder or to carry out a mechanical uniting, such as needling or stitching. This curling is more easily obtained by adjusting the flame which produces the drawing under turbulent conditions.

A person skilled in the art moreover clearly knows that the needling of mineral fibers produces holes visible to the naked eye and that needled mats are not homogeneous for a weight per unit area of less than 150 g/m$^2$. Conventional web-forming techniques do not make it possible to produce homogeneous mats which hold together well below a weight per unit area of 200 g/m$^2$. Techniques for spinning through bushings result in fibers requiring the use of organic binders in order to give cohesion to the nonwoven. In point of fact, these organic binders decompose under the action of UV radiation, which damages the mat and is capable of generating VOCs.

The pure silica fiber (at least 99% of SiO$_2$) is particularly preferred as it is particularly transparent to UV radiation, which allows it to transport UV radiation in all the media in the fashion of optical fibers and with a minimum of absorption.

The felt obtained by this process (flame stretch-blow molding, followed by throwing onto a surface in forward progression) is a nonwoven, the weight per unit area of which can be adjusted according to the speed of the receiving system (such as a rotating drum). The receiving system is adjusted so as to obtain a weight per unit area of between 30 and 80 g/m$^2$. These felts exhibit a thickness ranging from 1 to 200 mm and a density of less than 60 kg/m$^3$. The fibers of this nonwoven have a length generally ranging from 3 cm to 100 cm. This stretch-blow molding process makes possible the preparation of mats of pure silica or of glass (at least 60% of SiO$_2$ in the case of glass). These mats are excellent and preferred as they are flexible (as nonsintered) and devoid of any organic matter.

The final media exhibits a thickness which is generally less than that of the felt used and which generally ranges from 1 to 50 mm and more generally between 2 and 30 mm.

It is possible, alternatively to this drawing process, to start from preexisting fibers with a diameter of 7 to 14 μm which are cut to lengths of less than 150 mm and generally of greater than 45 mm. The cut fibers are then put into the form of a web, either by pneumatic web forming or by carding-web forming. The web thus formed is subsequently subjected to preneedling, followed by needling in a vicinity of 100 strokes/m$^2$. By this methodology, webs with a weight per unit area of 60 g/m$^2$ and 2000 g/m$^2$ can be produced. In the PCO applications to which the present invention relates, products with a grammage of less than 80 g/m$^2$ will be favored. These products exhibit thicknesses generally of less than 30 mm and generally densities of less than 70 kg/m$^3$ and even of less than 60 kg/m$^3$. The density and the thickness can be adjusted by a person skilled in the art according to the number of strokes/m$^2$ of substrate practiced by the needling, which gives the felt a greater or lower density.

The media can also be prepared by the paper making route (dispersion of the fibers in a pulper, followed by forming by the wet paper making route) using, in order to retain an essentially mineral structure, a binder which is a ceramic precursor, preferably of the sol-gel type, in particular with a precursor for example of the TEOS (tetraethyl orthosilicate) or MTES (methyltriethoxysilane) type, which, after calcination, will be converted to ceramic. This binder can be deposited locally pointwise or according to a predefined pattern in order to safeguard the flexibility of the felt.

The processes which have just been mentioned produce a felt without holes visible to the naked eye.

The fiber preferred as backing felt for the catalyst having a photocatalytic action is a quartz fiber (at least 99% of silica) as it withstands well the conversion of the silica sol-gel to ceramic (between 400 and 600° C.), it is very pure, devoid of alkalines and is particularly inert with regard to the catalyst, and, furthermore, it conducts UV radiation very well without absorbing it.

The completed felt is subsequently impregnated with a solution comprising an organic precursor of silica (such as TEOS, MTES, indeed even a mixture of several precursors of alkoxysilane type with the chemical formula R'$_x$Si(OR)$_{4-x}$, in which R and R' are organic radicals and x is an integer ranging from 0 to 3) and a dispersion of a compound having a photocatalytic action, such as TiO$_2$ having a photocatalytic action or zinc oxide (ZnO), the titanium oxide nevertheless remaining the favored catalyst as a result of its high efficiency in PCO applications. The invention also relates to a process for the manufacture of a media comprising a stage of impregnation of the felt of inorganic fibers with a composition comprising tetraethyl orthosilicate (TEOS) and at least one alkoxysilane of formula R'$_x$Si(OR)$_{4-x}$ in which R and R' are organic radicals and x is an integer ranging from 0 to 3, the amount of alkoxysilane representing from 10 to 40% and preferably from 15 to 25% of the weight of TEOS.

The impregnation solution can be prepared according to the instructions present in WO 97/10186 and WO 03/087002. By way of example, the impregnation solution can be prepared by premixing a solution A (silica precursor) and a solution B (surfactant), a dispersion of titanium oxide subsequently being added to said premix. By way of example, it can be prepared on the basis of the ingredients shown in table 2 below:

TABLE 2

|  | Reactant | Supplier and reference | Weight (kg) |
|---|---|---|---|
| Solution A | TEOS | Prolabo ref. 24 004.290 | 5 |
|  | Absolute ethanol | Prolabo ref. 20 821.467 | 8.34 |
|  | Demineralized H$_2$O pH 1.25 (1M HCl) | Prolabo ref. 30 024.290 | 4.29 |
| Solution B | Block polymer of propylene oxide and of ethylene oxide | BASF PE6200 | 3.85 |
|  | Absolute ethanol | Prolabo ref. 20 821.467 | 40.28 |
| Addition of A to B | A + B |  | 61.76 |
| Catalyst C | P25 (TiO$_2$ at 19.3% in water) | Degussa | 33.33 |
| Addition of C to (A + B) | C + (A + B) |  | 95.09 |

The amount of water is adjusted in order to obtain a volume of 100 liters for the final solution. Two solutions A and B are thus prepared and mixed, and then a suspension of catalyst $TiO_2$ in water is added to this mixture of A+B. The 33.33 kg of C are the weight of 19.3% suspension of the catalyst (not of pure catalyst).

A second example of the preparation of an impregnation solution is given in Table 3 below:

TABLE 3

| | Reactant | Supplier and reference | Weight (kg) |
|---|---|---|---|
| Solution A (The ingredients are mixed until clear and then heating is carried out at 60° C. for 1 h or at 50° C. for longer) | TEOS (d = 0.93) | Prolabo ref. 24 004.290 | 9.90 |
| | Absolute ethanol (d = 0.79) | Prolabo ref. 20 821.467 | 8.34 |
| | Demineralized $H_2O$ pH 1.25 (1M HCl ref. 30 024.290) | Prolabo | 4.29 |
| Solution B (The ingredients are mixed until the PE6800 has dissolved) | Block polymer of propylene oxide and of ethylene oxide | BASF PE6800 | 3.85 |
| | Absolute ethanol (d = 0.79) ref. 20 821.467 | Prolabo | 40.28 |
| Addition of A to B | A + B | | 66.67 |
| Catalyst C | $TiO_2$ at 19.3% in water | Millenium S5 300A | 33.33 |
| Addition of C to (A + B) | C + (A + B) | | 100 |

A composition which is particularly suited to the deposition of the coating involves, as silica precursor, a mixture of MTES and of TEOS. This is because the sol-gel obtained from this mixture is more flexible and less subject to dust formation if compared with a 100% TEOS or 100% MTES precursor. Preferably, use is made of a mixture of 15-30% of MTES per 85-70% of TEOS.

The felt is impregnated in a full bath with the impregnation solution, the latter being sucked through the felt, which is subsequently expressed (which means: pressed in order to remove the impregnation liquor) and dried.

The felt obtained is subsequently calcined in a temperature of from ambient temperature to 550° C., in particular at approximately 450° C., which then makes it possible to convert the silica precursor to silica. Preferably, the rise in temperature up to the maximum temperature is carried out with a moderate rate, preferably of less than 6° C. per minute. By way of example, this heat treatment can be that shown in table 4 below:

TABLE 4

| Temperature | Stationary phase | Rate of temperature rise up to the stationary phase |
|---|---|---|
| Ambient | | |
| 100° C. | 2 h | 3° C./min |
| 150° C. | 2 h | 3° C./min |
| 175° C. | 2 h | 2° C./min |
| 200° C. | 10 min | 3° C./min |
| 300° C. | 1 h | 2° C./min |
| 450° C. | 1 h | 1° C./min |

The cooling can be natural cooling in ambient air.

In the case of the use of Si and Ti precursors to produce the coating having a catalytic action, the ratio of the Si and Ti precursors is preferably varied in order for the Si/Ti molar ratio in the coating having a catalytic action to be between 0.25 and 1.35 and more preferably between 0.5 and 1.3.

The filtering media having a photocatalytic action according to the invention is thus obtained. This media can be sucked via a suction table in order to remove the particles (micronic and submicronic) of coating exhibiting low adhesion. This makes it possible to avoid significant dust formation by the PCO media and generation of particles during the first startups of the PCO purifier.

It can be fitted to cartridge and photocatalytic reactor systems.

The weight of catalyst (such as $TiO_2$) is generally less than or equal to 40% by weight and, if possible, less than 30% by weight, optimally of approximately 15% by weight, with regard to the final product (media) obtained. Preferably, the weight of catalyst is greater than or equal to 1% by weight and more preferably greater than or equal to 5% by weight, with respect to the final media.

In the case of a $TiO_2$ catalyst, the latter preferably comprises as much as possible of anatase.

In some types of application (bactericidal application, destruction of ozone and sulfur compounds of $H_2S$ or DMDS (dimethyl disulfide of formula $CH_3$—S—S—$CH_3$) type), the composition can be doped with at least one compound, such as MnO, $Mn_2O_3$, dicyanoanthracene (DCA) or a compound comprising at least one of the elements from the group of the elements V, Cr, Mn, Mo, In, Sn, Fe, Ce, Co, Cu, Nd, Zn, W, Nb, Ta, Bi, Ni, Ru and Ag, said compound being at a concentration of less than 0.5% by weight of the weight of catalyst, in order to increase the efficiency of the media.

The felts prepared as indicated above exhibit the following properties:
they are essential of mineral nature;
they exhibit a pressure drop of less than 150 Pa at 1 m/s and more generally of less than 50 Pa at 1 m/s and even of less than 20 Pa at 1 m/s of gas;
they are homogeneous and thus without a preferential pathway for the gas passing through it;
they do not exhibit holes visible to the naked eye.

The preparation of the photocatalytic coating can sometimes present problems of adhesion to the fiber, in particular when the latter is subjected to mechanical stresses, even weak mechanical stresses, for example during handling. The detachment of the coating is reflected by the formation of an undesired dust. This detaching is also known as "dust formation".

In order to reduce this formation of dust, it is possible to reduce the thickness of the coating. It is also possible to attach the coating using a polymer. However, the latter has to be able to resist oxidation under the joint effect of UV radiation and the PCO effect of the catalyst, the powers received very often being between 2 and 40 $mW/cm^2$ of UV-A, UV-B or UV-C.

It has been discovered that the polymers comprising fluorine, such as polytetrafluoroethylene (PTFE), or a fluorosilane (such as the fluorosilanes sold under the references F8820, F8810 and F8263 by Degussa), and to a lesser extent a polysiloxane polymer (such as a silicone), have sufficient stability towards UV radiation and towards the PCO reaction in this type of application. The polymer can be deposited on the fibers of the media in the form of a dispersion in a liquid, in particular using an aqueous dispersion. Use is preferably made of an aqueous dispersion of the polymer devoid of surfactant or comprising as little as possible of surfactant. This is because, with some types of surfactant used for these dispersions, for example for dispersing PTFE, a strong odor may appear in the application at the beginning of the use of the filtering media, as a result of the decomposition of the surfactant under the PCO action. Appropriate polymer dispersions are, for example, the PTFE dispersions sold under the references Teflon 30 B, Teflon 304 A, Teflon B and Teflon-3823, sold by DuPont de Nemours. Mention may also be made of silicone polymers from Rhodia Silicone, such as 83% Rhodorsil Resin 20 B or Rhodorsil Resin 6405, or siloxane polymers from Wacker, such as Silres H62C. PTFE is a preferred polymer.

The polymer dispersion is applied to the media after the ceramization heat treatment which has resulted in the formation of the coating having a photocatalytic action. Generally, from 0.1 to 5% by weight of polymer, with respect to the weight of the final media, is deposited on the media. The deposition of the polymer can be carried out either by spraying on one or both faces with the suspension or by immersion-dipping in the suspension, followed by expressing. These impregnations can generally be carried out at ambient temperature, in particular at a temperature of between 10 and 40° C. For the case where the dispersion of the polymer comprises a surfactant, preferably a heat treatment is carried out generally between 45° C. and 250° C. (especially between 150 and 250° C. in the case of a fluoropolymer (not of the polysiloxane type), for example a few minutes at 230° C., and especially between 100 and 180° C. in the case of a fluorinated polysiloxane) or a UV treatment is carried out (in this case, at a high UV intensity, in particular between 15 and 100 mW/cm$^2$) after the application of the polymer dispersion and before the true use in order as best as possible to remove the surfactants used to disperse the polymer in the dispersion, in particular fluoropolymers in aqueous dispersion.

Fortuitously, it has furthermore been discovered that the PCO substrates, the coating of which comprises a hydrophobic polymer, in particular a fluoropolymer or a polymer of the polysiloxane type, can float on the surface of the water. Such media are highly advantageous in purifying the atmosphere irradiating from a settling tank, from a water-treatment plant, from a (factory) lagoon, and the like. This is because the media can be cut into surface fragments ranging from a few mm$^2$ to a few cm$^2$ run onto the surface of the water to be treated. As a result of its floating nature, the media is easily distributed at the surface of the water (without major additional cost, such as floating containers fitted to floats). The media then adsorbs the pollutants emanating from the polluted water and oxidizes them under the action of solar UV radiation. This principle is highly economic in very substantially reducing the emanations, foul-smelling and sometimes dangerous in terms of chemical compounds, from this type of installation. Thus, the invention also relates to a process for the purification of the air above water comprising impurities which generate volatile organic compounds in the air above said water, by virtue of the placing, at the surface of the water, of a filtering media having a photocatalytic action which is self floating (according to the invention) by means of a suitable coating which allows it to float. This coating preferably comprises a hydrophobic polymer applied to the fibers of said media.

The media according to the present invention comprises a surface which is active and homogeneous (without apparent preferential pathway for the air) over the entire surface of the media with a very low pressure drop, in particular as a result of its very low grammage (or weight per unit area) and its low associated bulk density. Furthermore, as the media is very thick, it makes it possible to have a photocatalytic oxidation effectiveness (PCO effectiveness) throughout its thickness.

A simple way of characterizing photocatalytic activity of a media is to test in traversing mode the percentage of decomposition of a specific pollutant, such as methanol, in a laboratory reactor. To this end, a reactor developed by the team of Professor Pichat of l'Ecole Centrale de Lyon is commonly used in universities and laboratories. This reactor is generally composed of a body made of stainless steel inside which is placed a disk of media, for example with a diameter of 47 mm. UV illumination from an HPK 125 W lamp is carried out through a silica slit in the top part of the reactor. The illuminating power is regulated by adjusting the lamp/media distance. A power of 5 mW of UV-A per cm$^2$ of media, measured at 365 nm and measured on the media, is generally used. A continuous flow of filtered air comprising 300 ppm of pollutant (in particular methanol) is introduced at a rate of 350 ml/min upstream of the reactor. The concentration of pollutant is then measured downstream of the reactor, after PCO treatment, generally by chromatography. It is important to make sure that the pollutant has been converted to minerals (conversion to $CO_2$ and $H_2O$) by checking the chemical balance in order not to have solely phenomena of pure adsorption, as may be found with systems of the active charcoal type. This test, applied to methanol, is referred to subsequently as the "methanol test".

The filtering media according to the invention, in unpleated condition, causes a pressure drop of less than 150 Pa at 1 m/s of gas and even generally of less than 50 Pa at 1 m/s of gas and even of less than 20 Pa at 1 m/s of gas, which is remarkably low, while providing excellent purification.

In the case of a high concentration of pollutant in the atmosphere to be treated (for example during pollution peaks or at the beginning of the decontamination treatment by the filtering media according to the invention, which can easily be detected by sensors of volatile organic compounds), the formation of intermediates, such as formaldehyde, acetaldehyde or acetone, becomes more pronounced as the flow rate and/or the UV power increases. As some of these derivatives are particularly toxic, it is then recommended (if these particular conditions occur), in order to overcome their formation, briefly to:

greatly reduce the UV intensity and/or
greatly reduce the flow rate of the purifier, that is to say the rate of passage of the gas to be treated through the filtering media.

By combining these two actions, a photocatalytic purifier makes possible efficient purification of the air without increasing the levels of harmful intermediates during the first minutes of the start of the device or of flow of the pollutant peak. Subsequently, the UV intensity and the flow rate of the device can be returned to their nominal value in order to provide a maximum PCO effect.

This reduced operating capacity is to be followed at the beginning of operation, when the room or atmosphere is highly charged with VOC. This is because, in this case, the VOC in high concentration at the start generates other VOCs by decomposition on contact with the filtering media, said other VOCs being themselves in relatively high concentration, and the combination of a high concentration of VOC and of a high gas rate then perhaps does not allow the filtering media to "convert to minerals" all the VOCs in the purifier. In other words, there would be so much VOC in the purifier that a high proportion of these VOCs would risk passing through the purifier. This risk decreases the smaller the starting concentration of VOC as then the filtering media surface area becomes sufficient to convert to minerals all the VOCs, intermediate or not. It is thus indeed the same chemical decomposition reactions of the VOCs in the purifier which take place but, in the case of a high concentration of VOC in the atmosphere to be purified, there is a risk that the process of conversion to minerals (sequence of chemical reactions) will not be able to go to completion because of saturation of the purifier.

As example of a sequence of chemical decomposition reactions in the purifier, a process for the decomposition of methanol is: methanol→formaldehyde→formic acid→$CO_2$. As example of a sequence of chemical reactions, a process for the decomposition of ethanol is: ethanol→acetaldehyde→acetic acid→formaldehyde→formic acid+$CO_2$→2 $CO_2$. Depending on the characteristics of the photocatalytic purifier (type of media, air rate, level of UV illumination) and the concentration of VOC at the inlet (pollutant) of the purifier, the intermediate reaction products may or may not be completely converted to minerals during the passage over the photocatalytic media of the initial molecule of starting pollutant.

It is possible, in order to further increase the efficiency of the photocatalytic reactor system according to the invention, to vary the increase in the surface area of active media and the reduction in the pressure drop. If the installation of several filtering media in series makes it possible to increase the active surface area, the pressure drop is, however, correspondingly increased thereby. In order to achieve this objective, it is possible to combine the increase in surface area of active photocatalytic media with an increase in the frontal surface area, the pressure drop decreasing as the frontal surface area in contact with the air flow increases. To this end, the media according to the invention can be positioned in a filtration cartridge so as to present a longer surface to the gas to be treated. Thus, instead of being positioned in a simple linear thickness transversely with respect to the direction of the gas, it is possible to confer on it a shape comprising at least one angle, such as a V shape, W shape, and the like (until a true "accordion" is formed) or to give it a pleated structure. The media can also be placed in articulated cartridges which follow the preceding designs, allowing the cartridge to be placed in a reactor with a minimum of lost space. This point is particularly advantageous in domestic air conditioning systems. This is because, very often, the suction conduits are very quickly bent at an angle behind the dust filtration components. Insofar as the PCO purifier systems are placed in the dust filtration region, the bulkiness of the PCO reactor has to be limited. Such an articulated cartridge system makes it possible to avoid the bulkiness of an angled system for its installation while benefiting from the angled shape once in a working position, which makes it possible to reduce the pressure drop of the system. The cartridge can thus be inserted straight (without an angle) into the slit which makes it possible to introduce it into the PCO reactor and the angled shape is automatically assumed inside the reactor at the time of the insertion. FIGS. 3a and 3b show PCO filters inside which the PCO media has a V or W shape. Thus, the invention also relates to a filter cartridge comprising at least one angle and comprising a PCO media, said angle being, if appropriate, articulated.

The PCO purifier according to the invention is intended in particular for domestic air purification applications. One of the major applications is the reduction of ozone in a domestic environment. By virtue of the invention, an ozone reduction efficiency of 90% can be achieved.

The PCO purifier according to the invention is also used for the purification of air in the service, commercial or industrial sector. In this type of application, it is recommended to use media according to the invention in series in order to generate a higher weight per unit area in comparison with that which is suitable for domestic surroundings. For example, in the context of use in an industrial catering environment equipped with a system for cleaning grease (starting with ozone), a 50 $g/m^2$ media generally does not make it possible to lower ozone levels, sufficiently high at a level of 300 ppb, in one pass at 1 m/s. It is then necessary to use medias according to the invention in series (that is to say, one after the other, if appropriate in contact), generally between 2 and 10 medias, more particularly from 3 to 6 medias, which makes it possible in one pass to oxidize, for example, 150 ppb of the 300 ppb of ozone present in the inlet gas, the UV power received per filter being 50 $mW/cm^2$ of UV-C illumination. This type of process can be envisaged in particular in industrial kitchen implementers in which ozone is generated in order to remove the grease deposited in the extraction hoods of the kitchens. This results in a strong smell and high concentration of ozone which can be destroyed by the PCO system according to the invention.

The PCO system according to the invention can also be used in industrial applications, such as warehouses or refrigerators for the storage of easily damaged plant products (such as fruit, vegetables, flowers). In this context, it is important to reduce the concentration of ethylene in the warehouse in order to slow down the ripening of the fruit or the wilting of the flowers. The invention consequently relates to the use of the media or of the purifier or of the device according to the invention to purify the air of a warehouse or of a refrigerator containing a plant, in particular a fruit or vegetable or flower.

The PCO system according to the invention is also very efficient with regard to the decomposition of alcohols (methanol, ethanol, propanol) and solvents, for example used in the resin or composite industry or in the manufacture of fragrances. In this type of application, it is necessary to operate under EXAT regulated conditions (the expression EXAT originating from "EXplosive ATmospheres") in order to avoid any risk of explosion. One of the problems is the nature of the PCO filtering media, which is actually essentially mineral in order to avoid any risk of ignition. In particular, preferably, for EXAT applications, postimpregnation polymer is not applied to the media in order to limit dust formation. The media of the present invention is then composed of an mineral substrate (felt) with a mineral coating doped with titanium oxide and corresponds fully to the specifications for PCO applications in EXAT surroundings.

The PCO system according to the invention comprises a source of light necessary for the catalytic activation of the titanium oxide coating. This source can be a UV-A, UV-B or UV-C mercury vapor lamp or a xenon lamp.

Furthermore, the invention also relates to devices for the specific illumination of a PCO media suitable for the PCO media according to the invention or any other PCO media. These devices are advantageous in particular from the viewpoint of the energy saving, of reduction in maintenance costs or of EXAT conformity.

The device for illuminating the fibrous media can be produced with a UV-A, UV-B or UV-C LED with an illuminating power of at least one 1 $mW/cm^2$. Such a system makes it possible to combine a minimum energy consumption with significant efficiency. Moreover, this type of illuminating system allows very specific designs with optimization of the illumination of the media. Thus, the invention also relates to a gas purifier comprising a filtering media having a photocatalytic action (according to the invention or not according to the invention) and a system for illuminating said media with UV, said illuminating system comprising an LED, preferably UV, generating an intensity received by the media at least equal to 1 $mW/cm^2$ of media.

Figure 14:
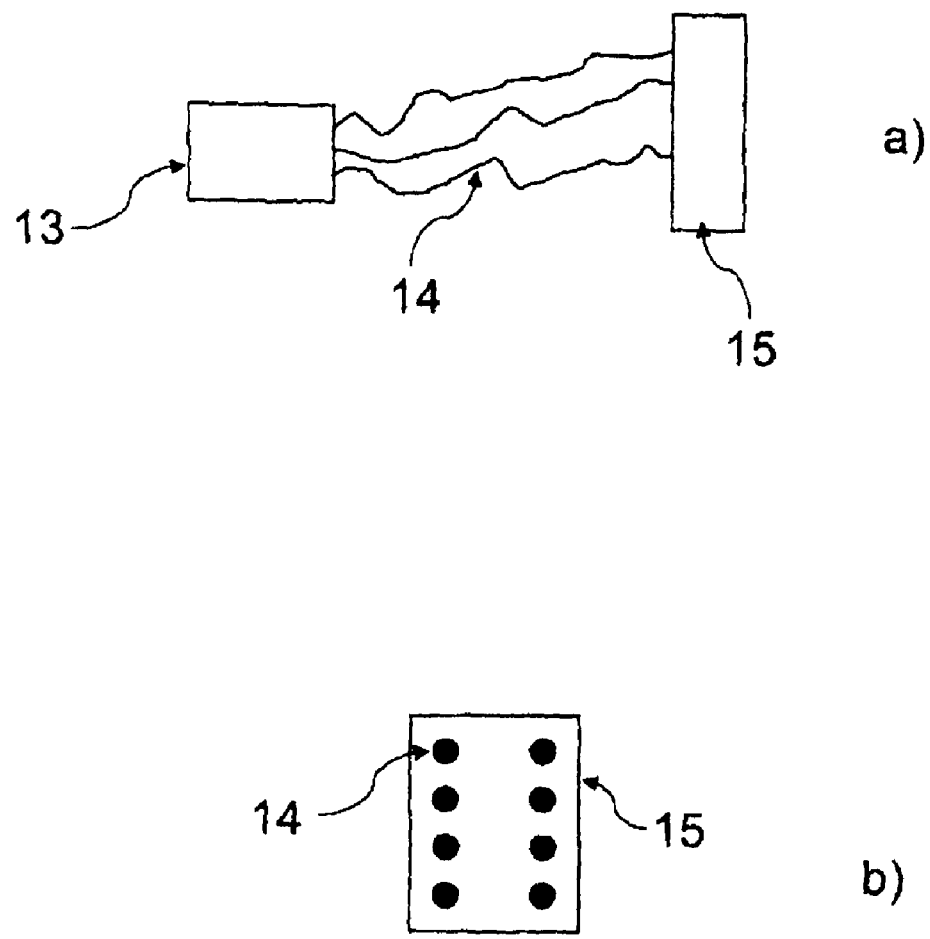
FIG. 14 depicts the principle of illumination of the filtering media via light guides for a reactor.

The device for illuminating the fibrous media can be produced with a light guide, for example an optical fiber: this system makes it possible to move the source away from the illuminating region and thus it relatively easily creates an EXAT region in the PCO reactor. Thus, the invention also relates to a gas purifier comprising a filtering media having a photocatalytic action (according to the invention or not according to the invention) and a system for illuminating said media with UV radiation, said illuminating system comprising at least one light guide (such as an optical fiber) in order to bring the light to said media. In industrial applications, it is not uncommon to find EXAT regions (outlets, uptakes). Currently, conventional UV lamps are not EXAT approved because of the lack of strength of their tube. A system for lighting with a light guide makes it possible to take the lamp out of the EXAT region and thus renders the system in accordance with the requirements of EXAT regions. The following systems can be envisaged:

starting from a UV source, it is possible to introduce several strands of light guide (for example of optical fiber type) into the reactor. These strands act as guide for introducing the light energy into the reactor. For example, it is possible to envisage a strand every $cm^2$ of substrate, so as to distribute the UV energy as homogeneously as possible in the reactor. The principle of such a system is represented in FIG. 14.

starting from a source, it is possible to introduce a single strand of light guide (such as optical fiber) into the reactor. This strand then illuminates a reflector or a mirror provided with a suitable curvature and the UV light is reflected by this mirror or this reflector as homogeneously as possible in the reactor. The principle of this system is represented in FIG. 14. The use of any other scattering system may also make it possible to achieve this objective.

Figure 16:
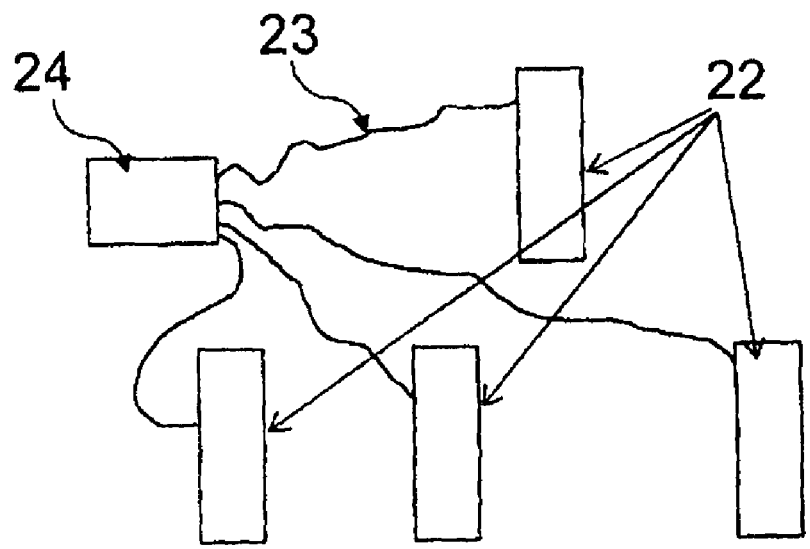
FIG. 16 depicts the principle of illumination of several filtering medias via light guides for several reactors connected to a single UV generator.

The device for illuminating the fibrous media can also be centralized with regard to several PCO reactors. This makes it possible to have a single region for the generation of UV radiation relayed, via a system for illuminating with a light guide (for example of optical fiber type) different PCO media. This system provides a not insignificant energy saving by avoiding the need to have multiple sources and by reducing the consumption of ballasts and the inevitable losses due to multisource systems. The principle of this system is represented in FIG. 16. Thus, the invention also relates to a device for purifying the air comprising several air purifiers each comprising a filtering media having a photocatalytic action (according to the invention or not according to the invention) and comprising a single source of lighting of the medias of the purifiers.

Thus, the invention also relates to a gas purifier comprising a filtering media having a photocatalytic action (according to the invention or not according to the invention) and a system for illuminating said media with UV radiation, said illuminating system comprising light guides (for example of optical fiber type) and/or a cold light.

The device for illuminating the fibrous media can be produced with a flat lamp. This system makes possible an extremely homogeneous illumination of the entire surface of the PCO media and thereby increases the oxidation yield and thus the efficiency of the system. Thus, the invention also relates to a gas purifier comprising a filtering media having a photocatalytic action (according to the invention or not according to the invention) and a system for illuminating said media with UV radiation, said illuminating system comprising a flat lamp.

When the PCO system is operated in an atmosphere polluted with VOCs, the concentration of these VOCs can be fairly high at the beginning of operation. This high concentration of VOCs can be reflected by the undesired formation, subsequent to the operation of the PCO system according to the invention, of intermediate compounds (formaldehyde, acetaldehyde, acetone) which are also toxic. This is why it is recommended, in the case of a VOC concentration which is believed to be high, to start the operation of the PCO system according to the invention in an attenuated mode, either by reducing the UV power or by reducing the flow rate of gas or both. After a certain time, when the VOC concentration is lower, it is possible to increase the operating power. A weakened UV illumination (for the beginning of operation) is, for example, less than 8 $mW/cm^2$ and even less than 7.5 $mW/cm^2$. A weakened gas flow rate is, for example, less than 60% and even 50% of the nominal gas flow rate. The concentrations of some VOCs measured in standard fashion in residential rooms are given in table 5 below. These values are the results of several hundred measurements. The right-hand column "critical concentration" of table 5 shows, by way of indication, the concentrations above which is recommended to reduce the operating capacity of the PCO purifier according to the invention by reducing the flow rate of gas passing through it and/or by reducing the UV intensity illuminating the PCO media. The invention thus relates to a process of the purification of gas using a purifier comprising a filtering media having a photocatalytic action (according to the invention or not according to the invention) and a system for illuminating said media with UV radiation, so that, when the concentration of a compound in the gas is greater than a value V1, the operating capacity of the purifier is lower than its capacity when the concentration of the compound in the gas is less than a value V2, V2 being less than or equal to V1. In the case of formaldehyde (very common impurity), it is recommended to reduce the operating capacity of the purifier when the concentration of formaldehyde is greater than 30 $\mu g/m^3$. The operating capacity can be increased when the concentration of formaldehyde is less than 30 $\mu g/m^3$. More generally, the purifier can be operated with a reduced operating capacity when the concentration of formaldehyde is greater than a value V1 between 0.3 and 80 $\mu g/m^3$ and then the operating capacity can be increased when the concentration of formaldehyde is less than a value V2 between 0.3 and 80 $\mu g/m^3$, V2 being less than or equal to V1.

TABLE 5

| | Normal values (residential rooms) | | | Critical concentration |
|---|---|---|---|---|
| | Median $\mu g/m^3$ | Minimum $\mu g/m^3$ | Maximum $\mu g/m^3$ | $\mu g/m^3$ |
| Formaldehyde | 24.0 | 2.0 | 74.8 | 30.0 |
| Hexaldehyde | 17.0 | 0.7 | 138.0 | 22.0 |
| Toluene | 15.6 | 3.6 | 145.2 | 20.0 |
| Acetaldehyde | 12.0 | 1.4 | 78.0 | 15.0 |
| Limonene | 8.9 | 1.5 | 71.2 | 11.0 |
| Isobutyraldehyde/butyraldehyde | 8.8 | 0.7 | 24.0 | 11.0 |
| Undecane | 6.9 | 1.1 | 146.2 | 8.0 |
| α-Pinene | 5.9 | 0.7 | 262.1 | 7.0 |
| Decane | 5.9 | 0.7 | 105.5 | 7.0 |
| Valeraldehyde | 5.0 | 0.7 | 27.0 | 6.0 |
| (m + p)-Xylenes | 4.7 | 1.6 | 76.7 | 6.0 |
| 1,2,4-Trimethylbenzene | 2.4 | 0.7 | 55.4 | 4.0 |
| Isovaleraldehyde | 2.1 | 2.1 | 3.0 | 4.0 |
| Ethylbenzene | 2.0 | 0.7 | 24.5 | 4.0 |
| o-Xylene | 1.8 | 0.7 | 24.6 | 4.0 |
| Benzene | 1.8 | 0.7 | 14.1 | 4.0 |
| 1-Methoxy-2-propanol | 1.7 | 0.7 | 32.1 | 4.0 |
| Tetrachloroethylene | 1.4 | 0.7 | 73.6 | 4.0 |
| Butyl acetate | 1.4 | 0.7 | 40.9 | 4.0 |
| 1,4-Dichlorobenzene | 1.4 | 0.7 | 293.2 | 4.0 |
| 2-Ethyl-1-hexanol | 1.0 | 0.7 | 12.1 | 3.0 |
| 2-Butoxyethanol | 0.7 | 0.7 | 14.0 | 2.0 |
| 1,1,1-Trichloroethane | 0.7 | 0.7 | 6.1 | 2.0 |

TABLE 5-continued

| | Normal values (residential rooms) | | | Critical |
|---|---|---|---|---|
| | Median $\mu g/m^3$ | Minimum $\mu g/m^3$ | Maximum $\mu g/m^3$ | concentration $\mu g/m^3$ |
| Trichloroethylene | 0.7 | 0.7 | 41.8 | 2.0 |
| Styrene | 0.7 | 0.7 | 5.3 | 2.0 |
| 2-Ethoxyethanol | 0.7 | 0.7 | 7.6 | 2.0 |
| 2-Ethoxyethyl acetate | 0.7 | 0.7 | 2.2 | 2.0 |
| Benzaldehyde | 0.7 | 0.7 | 2.0 | 2.0 |

In order to be able to detect if the gas to be purified (generally the air) exceeds the values for which it is recommended to reduce the power of the purifier, the purifier according to the invention is advantageously provided with a volatile organic compound analyzer. The purifier can operate completely automatically according to the contents of volatile organic compound transmitted by the analyzer: high capacity when the content is lower than a certain value, low capacity when the content is greater than a certain value.

Thus, the invention also relates to a gas (generally the air) purifier comprising a filtering media having a photocatalytic action (according to the invention or not according to the invention) comprising a means for varying the flow rate of gas passing through it or (which means and/or) for varying the intensity of the UV illumination. The purifier can comprise a volatile organic compound analyzer and a means for automatically adjusting the rate of the gas passing through it or for adjusting the intensity of the UV illumination according to the content of volatile organic compound analyzed by the analyzer. The purifier can analyze the incoming gas or the exiting gas but generally analyzes the incoming gas. An example which may be given of a suitable device operating according to this principle is the operating mode which follows, according to which, above the content C1 of a VOC, the device operates in reduced mode. Above a content C1 of a VOC, the analyzer gives a signal 1 which enters a regulator, which is programmed to convert this signal 1 to an outlet instruction 1 in accordance with a mathematical formula, said instruction then operating a variable speed drive which controls the speed (reduced) of the drive engine of the fan of the purifier, said fan driving a flow rate D1 (moderate) of gas through the purifier.

After a certain operating time at this reduced capacity and when the concentration of said VOC in the gas falls below C2 (C2 being lower than C1), then the analyzer gives a signal 2 to the regulator, which is programmed to convert the signal 2 to an outlet instruction 2 in accordance with a mathematical formula, said instruction then operating the variable speed drive which controls the speed (high) of the drive motor of the fan of the purifier, said fan driving a flow rate D2 (high) of gas through the purifier.

The gas speed and/or the light intensity can also be very simply adjusted as a function of the time. For example, when a purifier is started in a room comprising pollutants, it is recommended to operate with a low gas speed and/or low UV illumination for example over 2 h, the time to have sufficiently purified the room, and then to change to nominal capacity. Such a system prevents by-products from being formed, for example when the purifier is started. The purifier can thus comprise a time-delay means (that is to say a means which measures or determines the time or which triggers a device at the end of a certain time) which makes it possible to control the moderate or higher capacity of the purifier. The purifier can thus comprise a time-delay means and a means for automatically adjusting the speed of the gas passing through it and/or for adjusting the intensity of the UV illumination as a function of the time determined by the time-delay means. Recourse can be had to this time-based system, during the detection of a pollution peak by a system which is or is not independent of the purifier, such as, for example, information communicated on the radio, to place the system in reduced-capacity mode (low gas rate and/or low UV illumination) for a predefined time, the greater purification capacity subsequently being automatically engaged from the end of the predefined time. In such a device, by way of example, after starting the purifier, the control sequence, including a time-delay relay, gives an instruction 1 for reduced operation for a period of time 1 to a variable speed drive, which gives the speed instruction 1 to the drive motor of the turbine of the fan in order to entrain a flow rate D1 (reduced) of the gas through the purifier. After a predefined period of time at this reduced capacity, the control sequence, including the time-delay relay, gives an instruction 2 for operating at a greater capacity to the variable speed drive, which gives the speed instruction 2 to the drive motor of the turbine of the fan in order to entrain a flow rate D2 (greater) of gas through the purifier.

FIG. 1 represents very diagrammatically the structure of a PCO purifier according to the invention comprising two layers 2 of PCO media. The gas flow is represented by thick arrows, the left-hand arrow representing the incoming gas and the right-hand arrow representing the exiting gas. UV lamps 3 are placed between the two layers 2 of PCO media. A fan 5 provides air circulation. All these components are placed in a stainless steel chamber 1. The distance 4 between the UV lamp and the medias can be 20 mm. Such a purifier might furthermore comprise a particle prefilter at the start of the air arrival, that is to say placed to the left of the first PCO media.

Figure 2:
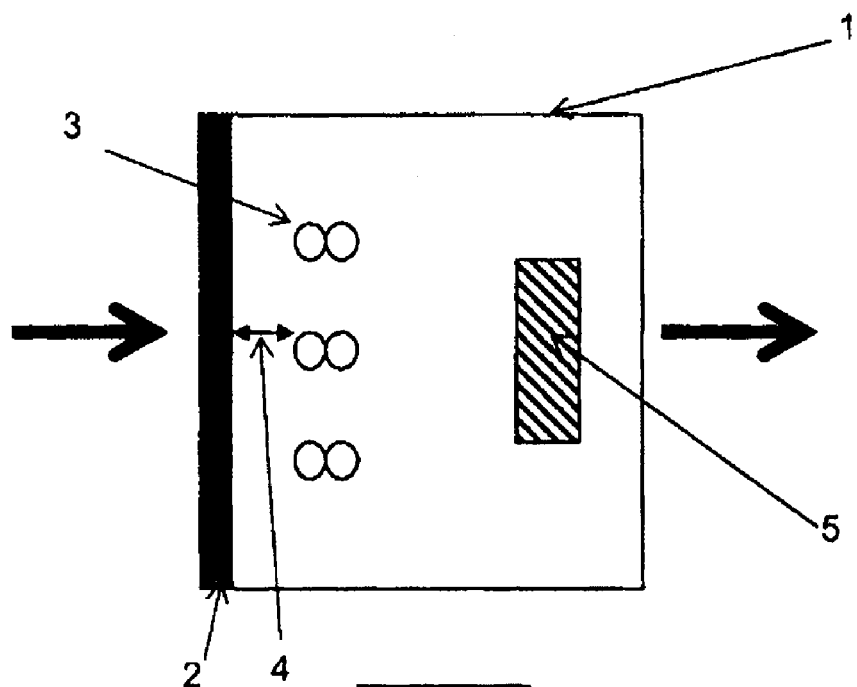
FIG. 2 depicts a purifier of the present invention containing one layer of media.

FIG. 2 represents the structure of a PCO purifier according to the invention comprising just one layer of PCO media 2. The air flow is represented by thick arrows. A UV lamp 3 illuminates the media 2. A fan 5 provides air circulation. All these components are placed in a chamber made of stainless steel 1. The distance 4 between the UV lamp and the media can be 20 mm. Such a purifier might furthermore comprise a particle prefilter as soon as air arrives, that is to say placed to the left of the first PCO media.

Figure 3:
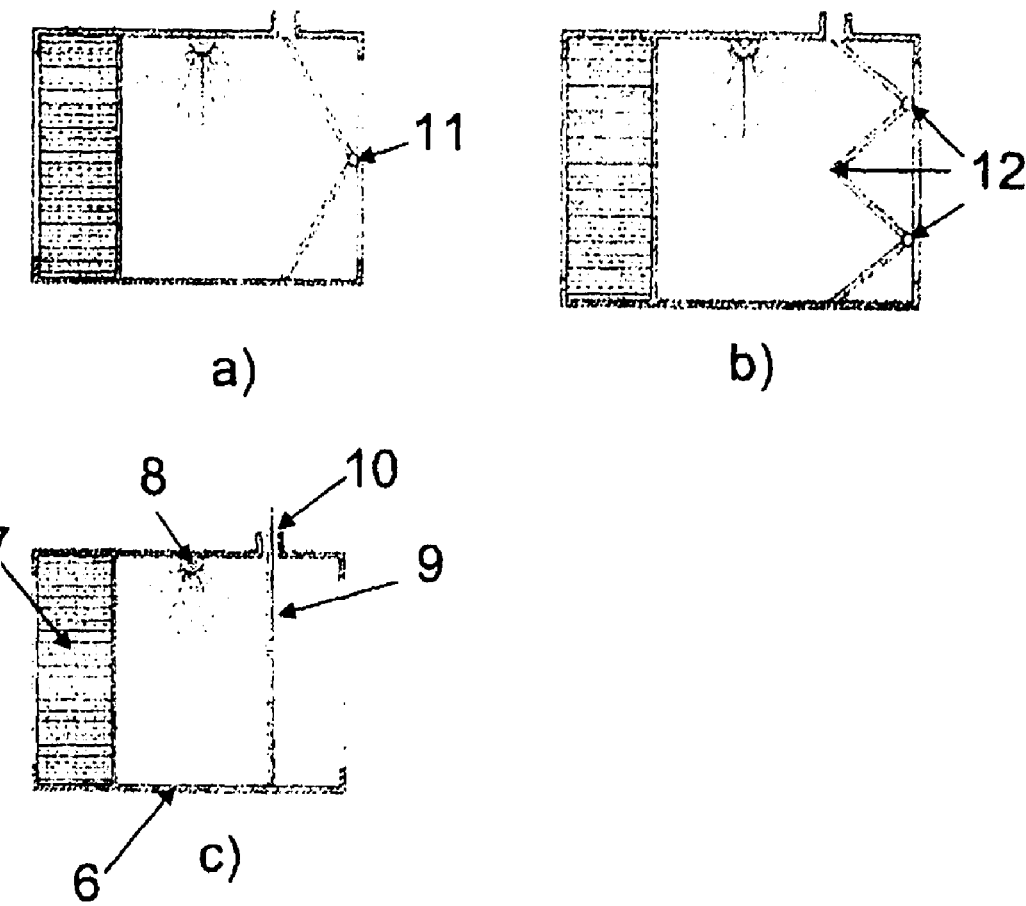
FIG. 3 depicts media having a "V" or "W" shape in filter modules.

FIG. 3 show PCO filter modules inside which the PCO media has the shape of a V or W. The module comprises a generally metallic (stainless steel, galvanized steel or aluminum) housing 6 comprising a particle prefilter 7, a UV lamp 8 and an articulated or nonarticulated cartridge 9 having a photocatalytic media. The cartridge goes into the unit via an opening 10. Depending on the place available for the opening of the housing, it is decided if the cartridge should or should not be articulated. For example, an articulated cartridge can go straight into the module through the opening 10 (FIG. 3c) and then folded into a V by virtue of the articulation 11 (see FIG. 3a). The cartridge can comprise three articulations 12 in order to assume the shape of a W, as in FIG. 3b.

FIGS. 4 to 13 give the results for the purification, by virtue of a media according to the invention, of air polluted by various molecules. FIGS. 4 to 11 correspond to the results of examples 24 to 31 and FIGS. 12 and 13 correspond to the results of examples 33 and 34.

FIG. 14 represents the principle of the illumination of the filtering media via several light guides (for example optical fibers) conveyed to the PCO reactor 15. In FIG. 14 a), it is seen that, starting from the source of UV light 13, several strands of light guide 14 convey the light to the reactor 15 for the purpose of illuminating the PCO media. In FIG. 14 b), the distribution in the arrival of eight light guides 14 on the section of the reactor 15, so as to distribute the UV energy as homogeneously as possible in the reactor 15, is seen.

Figure 15:
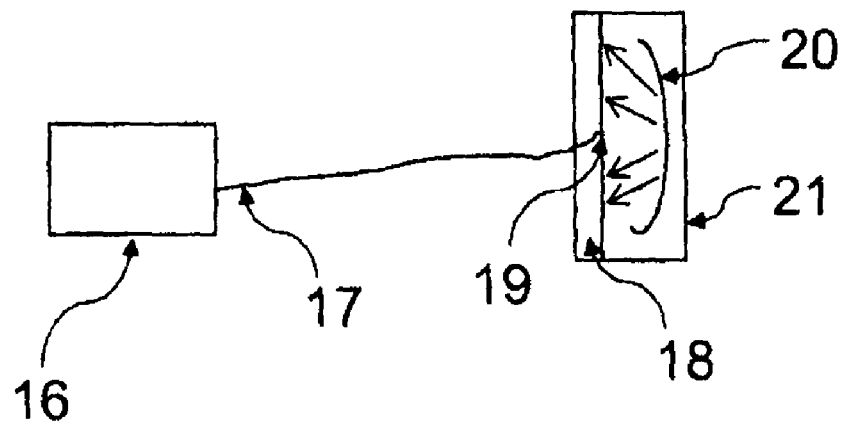
FIG. 15 depicts the principle of illumination of the filtering media via a light guide for a reactor.

FIG. 15 represents the principle of the illumination of the filtering media via a single light guide (for example optical fiber) conveyed to the PCO reactor 21. Starting from the UV source 16, a single strand 17 of light guide conveys the UV light to the reactor 21. In the case represented, the light guide passes through the media 18 to the illumination point 19 at the end of the light guide. This strand then illuminates a mirror 20 provided with an appropriate curvature and the UV light is reflected (arrows) by this mirror as homogeneously as possible in the reactor towards the media 18.

FIG. 16 represents the principle of the illumination of several PCO medias present in several PCO reactors 22 via light guides (for example optical fibers) 23 connected to a single UV generator 24. The illuminating device is thus centralized with regard to several PCO reactors. This makes it possible to have a single region of generation of UV radiation relayed by an illuminating system with a light guide to various PCO medias. This system avoids the need to have multiple sources.

EXAMPLES 1 to 13

Evaluation of Dust Formation

Felts are produced in the following way. Molten silica rods with a diameter of 4.4 mm are drawn in an oxy-propane burner in order to bring them to a filament diameter of 0.2 mm. This filament is then drawn again by flame stretch-blow molding in a second burner in order to obtain a mean diameter of 9 μm and thrown onto a receiving belt or drum. The speed of the drum is adjusted so as to obtain the weight per unit area of the felts which appear in the table below (2$^{nd}$ table). The felt obtained is then impregnated with the preparation obtained by the formulation shown in table 6 below:

TABLE 6

| | Reactant | Supplier and reference | Weight (kg) |
|---|---|---|---|
| Solution A (The ingredients are mixed until clear and then heating is carried out at 60° C. for 1 h or at 50° C. for longer) | TEOS | Prolabo ref. 24 004.290 | X |
| | MTES | Degussa | Y |
| | Absolute ethanol | Prolabo ref. 20 821.467 | 8.34 |
| | Demineralized $H_2O$ at pH 1.25 (1M HCl) | Prolabo ref 30 024.290 | 4.29 |
| Solution B (The ingredients are mixed with heating at 50° C. until the PE6800 has dissolved) | Block polymer of propylene oxide and of ethylene oxide | BASF PE6800 | 3.85 |
| | Absolute ethanol | Prolabo ref. 20 821.467 | 40.28 |
| Addition of A to B | A + B | | |
| Catalyst C | 19.3% $TiO_2$ in water | Millenium S5 300A | Z |
| Addition of C to (A + B) | | | To be adusted with water for a total of 100 liters |

Various tests were carried out with different amounts of TEOS, MTES and catalyst $TiO_2$ as reported in table 7 below.

TABLE 7

| Example | TEOS (X) | MTES (Y) | $TiO_2$ (Z) | Si/Ti | Other parameters | PCO efficiency (ppm) | Dust formation (mg/m²) |
|---|---|---|---|---|---|---|---|
| No. 1 (comparative) | | | | — | Reference: no impregnation | 0 | 0.2 |
| No. 2 | | | | — | Example 10, impregnation solution of which has been diluted 5 fold in water | 35 | 0.6 |
| No. 3 | 9.9 | | 10.6 | 1.79 | | 120 | 0.7 |
| No. 4 | 9.9 | | 15.15 | 1.25 | | 180 | 0.8 |
| No. 5 | 9.9 | | 22.72 | 0.83 | | 200 | 2.9 |
| No. 6 | 9.9 | | 22.72 | 0.83 | Sucked 90 s on a suction table with a suction rate of 1 m/s | 200 | 1.3 |
| No. 7 | | 9.9 | 22.72 | 0.97 | | 180 | 1.3 |
| No. 8 | 3.96 | 5.94 | 22.72 | 0.92 | | 160 | 1 |
| No. 9 | 7.62 | 2.27 | 22.72 | 0.87 | | 200 | 0.75 |
| No. 10 | 9.9 | | 33.33 | 0.57 | | 200 | 0.95 |
| No. 11 | 9.9 | | 22.72 | 0.83 | With postimpregnation with silane Dynasilan 8820 from Degussa at a level of 0.4% | 150 | 0.95 |
| No. 12 | 9.9 | | 22.72 | 0.83 | Spraying of Rhodorsil over the 2 faces of the media at a level of 0.3% | 170 | 0.8 |
| No. 13 | 9.9 | | 22.72 | 0.83 | Spraying of PTFE over the 2 faces of the media at a level of 0.3% | 230 | 0.1 |
| No. 13a | 9.9 | | 76.03 | 0.25 | Millenium S5 300 A | 150 | 7 |
| No. 13b | 9.9 | | 63.36 | 0.3 | Millenium S5 300 A | 160 | 6 |
| No. 13c | 7.67 | 2.27 | 97.66 | 0.2 | Millenium S5 300 A | 140 | 8 |
| No. 13d | 7.62 | 2.27 | 14.07 | 1.4 | Millenium S5 300 A | 130 | 0.7 |

The impregnated felt is subsequently subjected to a heat treatment under the conditions of table 4 already seen above. The final media obtained exhibits a weight per unit area after impregnation of approximately 120 g/m² and an apparent thickness of 20 mm and its content of titanium oxide is of the order of 20% by weight (except for case No. 1: no catalyst, and No. 2: less than 4% of catalyst).

Measurements for evaluating the tendency towards dust formation of the coating are subsequently carried out starting For example, in the catalyst P25 from Degussa, the $TiO_2$ comprises approximately ⅓ of rutile per ⅔ anatase.

TABLE 8

| Example No. | Felt grammage | TEOS (X) | MTES (Y) | $TiO_2$ (Z) | $TiO_2$ origin | Si/Ti | Other parameters | PCO efficiency (ppm) |
|---|---|---|---|---|---|---|---|---|
| 14 | 200 g/m² | 9.9 | | 33.33 | Millenium S5 300 A | 0.57 | | 240 |
| 15 | 80 g/m² | 9.9 | | 33.33 | Millenium S5 300 A | 0.57 | | 200 |
| 16 | 80 g/m² | 9.9 | | 33.33 | Millenium S5 300 A | 0.57 | Suction of the catalyst preparation 90 s on a suction table with a suction rate of 1 m/s | 200 |
| 17 | 65 g/m² | 9.9 | | 33.33 | Millenium S5 300 A | 0.57 | | 170 |
| 19 | 80 g/m² | 9.9 | | 33.33 | Millenium S5 300 A | 0.57 | Spraying of PTFE over the 2 faces of the media at a level of 0.3% | 230 |
| 20 | 80 g/m² | 7.62 | 2.27 | 33.33 | Millenium S5 300 A | 0.59 | | 200 |
| 21 | 65 g/m² | | 9.9 | 33.33 | Millenium S5 300 A | 0.66 | | 180 |
| 22 (comp.) | Media sold by Toshiba with a density of 0.7 g/cm³ in a thickness of 10 mm | | | | | | Ceramic foam PCO | 170 |
| 23 (comp) | Paper PCO + active charcoal, Ahlstrom with the reference 1054 | | | | | | Polyester felts PCO + active charcoal | 110 | from 100×100 mm² samples of PCO media. The samples are placed in a sieve of Fritsh/Labogerdebau type lasting 30 minutes with an amplitude of 4 (value specific to the machine). At the end of the 30 minutes, the residue is weighed and the loss in weight is related to 1 m² of substrate. The values are meaned over 5 samples. The results are reported in comparative fashion in table 7. The results are expressed as "dust formation", that is to say the amount of dust formed per unit of surface area of media (in mg/m²) and a PCO efficiency on the basis of the "methanol test" already described above. This efficiency is expressed as amount of methanol oxidized in ppm. In particular, test No. 13 is excellent as it combines a very good PCO activity with very low dust formation.

EXAMPLES 14 to 23

Oxidation of Methanol

Use is made of a reactor composed of a body made of stainless steel inside which is placed a disk of media with a diameter of 47 mm. HPK 125 W UV illumination is produced in the top part of the reactor through a silica slit. The illuminating power is regulated by adjusting the lamp/media distance. A power of 5 mW/cm² at 365 nm (of media) of UV measured at the media is used. Upstream of the reactor, a continual flow of filtered air comprising 300 ppm of methanol is introduced at the rate of 350 ml/min. The concentration of methanol is measured by gas chromatography downstream of the reactor, after PCO treatment. Conversion of the pollutant to minerals (conversion to $CO_2$ and $H_2O$) is ascertained by confirming the chemical balance in order not to have solely phenomena of pure adsorption as may be encountered with systems of the active charcoal type. The more specific operating conditions for producing the media and also the efficiency observed with regard to different medias in the context of the "methanol test" already explained above are given in table 8. In Millenium S5 300 A, the $TiO_2$ was 100% anatase. This is not necessarily the case for any catalyst based on $TiO_2$.

EXAMPLES 24 to 31

Oxidation of Organic Molecules at Various Flow Rates and Intensities of Illumination Molten silica rods with a diameter of 4.4 mm are drawn in an oxy-propane burner in order to bring them to a filament diameter of 0.2 mm. This filament is subsequently drawn again by flame stretch-blow molding in a second burner in order to obtain a mean diameter of 9 μm and thrown onto a receiving drum. The speed of the drum is adjusted so as to obtain a weight per unit area of the felt of 80 g/m². The felt is then impregnated in accordance with the formulation of Table 9 below:

TABLE 9

| | Reactant | Supplier and reference | Weight (kg) |
|---|---|---|---|
| Solution A (The ingredients are mixed until clear and then heating is carried out at 60° C. for 1 h) | TEOS | Prolabo ref. 24 004.290 | 7.00 |
| | MTES | Degussa | 2.9 |
| | Absolute ethanol | Prolabo ref. 20 821.467 | 8.34 |
| | Demineralized $H_2O$ at pH 1.25 (1M HCl) | Prolabo ref 30 024.290 | 4.29 |
| Solution B (The ingredients are mixed with heating at 50° C. until the PE6800 has dissolved) | Block polymer of propylene oxide and of ethylene oxide | BASF PE6800 | 3.85 |
| | Absolute ethanol | Prolabo ref. 20 821.467 | 40.28 |
| Addition of A to B | A + B | | 66.67 |
| Catalyst C | $TiO_2$ (19.3% in water) | Millenium S5 300A | 33.33 |
| Addition of C to (A + B) | C + (A + B) | | 100 |

The impregnated felt is subsequently subjected to a heat treatment under the conditions of table 4 already seen above.

The filtering media obtained exhibits an apparent thickness of 20 mm. The felt exhibits a total weight after impregnation of 120 g/m$^2$, the level of titanium oxide being 20% of the total weight of the media.

The efficiency of the photocatalytic media was measured by placing it in a PCO purifier with a flow rate of 130 m$^3$/h, the frontal velocity being 1 m/s and the illuminating power received being 15 mW of UV-C per cm$^2$ of media (these values were measured with a Bioblock VLX-3W radiometer with a 254 nm probe). The chamber is made of stainless steel and measures 1 m$^3$. The purifier is made of stainless steel. It is equipped with 3 Philips 36 W TUV lamps placed at 20 mm from the PCO media or medias. The media surface area is 270×420 mm$^2$. The PCO purifier comprises one or two media, as represented in FIGS. 1 and 2. The fan is placed behind the PCO filter or filters.

A pollutant mixture is introduced into the chamber at the rate of 1.95 l/min using a permeameter. This mixture is composed of benzene, toluene, o-xylene, decane, limonene and formaldehyde.

Fresh filtered air is introduced at the rate of 21 l/min and an outlet system pumps 23 l/min of the atmosphere, in order to simulate the degree of replacement of fresh air existing in any building. In the case of a high VOC concentration and in order to reduce the formation of a reaction intermediate which may be toxic, such as formaldehyde, acetaldehyde or acetone, it is important to operate with levels of UV illumination which are not excessively high and moderate flow rates, in order to increase the reaction time within the substrate and to make possible more complete oxidation of the organic compounds (which includes these possible undesired intermediate compounds) within the substrate.

The meanings of the various abbreviations are as follows:

| | |
|---|---|
| 1F: | 1 PCO media |
| 2F: | 2 PCO medias on either side of the UV lamp |
| Dmax: | Maximum flow rate (130 m$^3$/h) |
| D1/2: | Maximum flow rate divided by 2 |
| UV max: | Maximum UV illumination |
| UV/2: | Maximum UV illumination divided by 2 |
| UV min: | UV illumination received 2 mW/cm$^2$. |

The results are given by FIGS. 4 to 11. The time during which the purifier operates is indicated in the figures by the double-headed arrow "purifier in operation".

The oxidation of the various compounds benzene, toluene, decane, xylene and limonene by virtue of the PCO filter according to the invention is very marked from the various curves. Correspondingly, it is apparent that the formation of intermediates, such as formaldehyde, acetaldehyde or acetone, becomes more pronounced as the flow rate and UV power increase.

EXAMPLE 32

Ozone

Molten silica rods with a diameter of 4.4 mm are drawn in an oxy-propane burner in order to bring them to a filament diameter of 0.2 mm. This filament is then drawn again by flame stretch-blow molding in a second burner in order to obtain a mean diameter of 9 μm and thrown onto a receiving drum. The speed of the drum is regulated so as to obtain a weight per unit area of the felt of 65 g/m$^2$. The product is then impregnated with the preparation obtained according to the formulation of table 10 below:

TABLE 10

| | Reactant | Supplier and reference | Weight (kg) |
|---|---|---|---|
| Solution A (The ingredients are mixed until clear and then heating is carried out at 60° C. for 1 h) | TEOS | Prolabo ref. 24 004.290 | 5.00 |
| | MTES | Degussa | 4.9 |
| | Absolute ethanol | Prolabo ref. 20 821.467 | 8.34 |
| | Demineralized H$_2$O at pH 1.25 (1M HCl) | Prolabo ref 30 024.290 | 4.29 |
| Solution B (The ingredients are mixed with heating at 50° C. until the PE6800 has dissolved) | Block polymer of propylene oxide and of ethylene oxide | BASF PE6800 | 3.85 |
| | Absolute ethanol | Prolabo ref. 20 821.467 | 40.28 |
| Addition of A to B | A + B | | 66.67 |
| Catalyst C | 19.3% TiO$_2$ in water | Millenium S5 300A | 33.33 |
| Addition of C to (A + B) | C + (A + B) | | 100 |

The impregnated felt is subsequently subjected to a heat treatment under the conditions of table 4 already seen above.

The filtering media obtained exhibits an apparent thickness of 20 mm. The felt exhibits a total weight after impregnation of 100 g/m$^2$, the level of the titanium oxide being 20% by weight of the total weight of the media.

The tests were carried out in an experimental house. The purifier was that described in examples 24 to 31, equipped with 2 medias.

The test conditions were as follows:

office of 30 m$^3$ degree of replacement of air (DRA) between 0.6 and 1 volume/h felts of fibers of molten silica of the Quartzel trademark (registered trademark of Saint-Gobain Quartz SAS) and with a weight per unit area of 65 g/m$^2$ (media weight 100 g/m$^2$)

nominal flow rate, purifier 130 m$^3$/h

UV illumination received 15 mW/cm$^2$

The measurements were carried out one week before installing the purifier, one week during the operation of the purifier and one week after halting the purifier. The results are expressed as ratio of internal ozone concentration to external ozone concentration. This is because, under real conditions, as a degree of replacement of air always exists, fresh air laden with pollutant enters the room and stale air laden with pollutant exits from the room. In order to compare efficiencies, it is therefore useful to be able to operate in relation to internal air pollutant concentration/external air pollutant concentration. Without a PCO purifier, this ratio is 0.14. With the PCO purifier, this ratio is 0.01.

EXAMPLES 33 and 34

Molten silica rods with a diameter of 5.5 mm are drawn in an oxy-propane burner in order to bring them to a filament diameter of 0.2 mm. This filament is then drawn again by flame stretch-blow molding in a second burner in order to obtain a mean diameter of 9 μm and thrown onto a receiving drum. The speed of the drum is regulated so as to obtain a weight per unit area of the felt of 50 g/m$^2$. The felt is then impregnated with the preparation prepared according to the formulation of table 11 below:

TABLE 11

|  | Reactant | Supplier and reference | Weight (kg) |
|---|---|---|---|
| Solution A (The ingredients are mixed until clear and then heating is carried out at 60° C. for 1 h) | MTES | Prolabo ref. 24 004.290 | 9.90 |
|  | Absolute ethanol | Prolabo ref. 20 821.467 | 8.34 |
|  | Demineralized $H_2O$ at pH 1.25 (1M HCl) | Prolabo ref 30 024.290 | 4.29 |
| Solution B (The ingredients are mixed with heating at 50° C. until the PE6800 has dissolved) | Block polymer of propylene oxide and of ethylene oxide | BASF PE6800 | 3.85 |
|  | Absolute ethanol | Prolabo ref. 20 821.467 | 40.28 |
| Addition of A to B | A + B |  | 66.67 |
| Catalyst C | 19.3% $TiO_2$ in water | Millenium S5 300A | 33.33 |
| Addition of C to (A + B) | C + (A + B) |  | 100 |

The impregnated felt is subsequently subjected to a heat treatment under the conditions of table 4 already seen above. The filtering media obtained exhibits an apparent thickness of 20 mm. The felt exhibits a total weight after impregnation of 85 g/m², the level of titanium oxide being 20% of the total weight of the media.

The media is then placed in a purifier identical to that described for examples 24 to 31 (a single PCO media) with the following parameters:

nominal flow rate in the purifier: 130 m³/h;
UV illumination received: 15 mW/cm².

The purifier to be tested is placed in a Plexiglas chamber with a volume of one m³.

Prior to the test, the chamber is purged with ultrapure and humidified air in order to remove the presence of pollutant before the introduction of the mixture of model molecules. A liquid mixture of the various pollutants is introduced through a septum via a syringe into a glass weighing boat. Two mixtures were tested, one comprising propionaldehyde, heptane, acetone, toluene, acetaldehyde, ethylene, styrene and o-xylene (example 33) and the other comprising toluene, heptane, butyraldehyde, acetone and methoxyethanol (example 34). After evaporation, the concentration of the various compounds is of the order of a ppmv. The $CO_2$ is monitored with a gas microchromatograph equipped with a thermal conductivity detector (µGC-TCD) and the other pollutants are analyzed with a gas chromatograph equipped with a photoionization detector (PID). The PID makes it possible to analyze ionizable volatile organic compounds (VOCs) in the ppbv range. The possible presence of decomposition by-products in the gas phase is detected by adsorption on an adsorbent cartridge (flow rate 100 ml/min, time 20 minutes), followed by thermal desorption analysis coupled to a gas chromatograph and detected by mass spectrometry. The results are given in FIGS. 12 and 13. The PCO system according to the invention is found to be notably effective in removing the various solvents as soon as the UV illumination is triggered (the moment of illumination is indicated by the arrow "UV in operation"). In the case of example 34 (FIG. 13), acetaldehyde is momentarily formed beginning with the UV illumination and is then itself oxidized. The methoxyethanol peak between 40 and 70 min corresponds to a second injection of this product into the chamber. The affinity of methoxyethanol for the media is such that it is immediately adsorbed.

The invention claimed is:

1. A gas purifier comprising
   a filtering media having a photocatalytic action,
   a system for illuminating said media with UV radiation,
   a time-delay means or a volatile organic compound analyzer, and
   a means for automatically adjusting the speed of the gas passing through the media or for adjusting the intensity of the UV illumination, said adjusting being carried out as a function of the time determined by the time-delay means or as a function of the content of a volatile organic compound analyzed by the analyzer.

2. The purifier as claimed in claim 1, wherein it comprises a volatile organic compound analyzer and the analyzer analyzes the incoming gas.

3. The purifier as claimed in claim 1, said illuminating system comprising an LED generating an intensity received by the media of at least equal to 1 mW/cm² of media.

4. The purifier as claimed in claim 1, said illuminating system comprising at least one light guide for conveying the light to said media.

5. The purifier as claimed claim 1, comprising a filter cartridge comprising at least one angle, said cartridge comprising the filtering media having a photocatalytic action.

6. The purifier as claimed in claim 5, wherein the angle is articulated.

7. A device for purifying air comprising several purifiers as claimed in claim 1, wherein said device comprises a single source for lighting the medias of the purifiers.

8. The device as claimed in claim 1, wherein the lighting is transmitted to the purifiers via optical fiber light guides.

9. A process for the purification of a gas comprising passing the gas through the purifier of claim 1.

10. A process for purifying gas comprising passing the gas through a purifier comprising a filtering media having a photocatalytic action and a system for illuminating said media with UV radiation, wherein, when the concentration of a compound in the gas is greater than a value V1, the operating capacity of the purifier is lower than its capacity when the concentration of the compound in the gas is less than a value V2, V2 being less than or equal to V1.

11. The process as claimed in claim 10, wherein the compound is formaldehyde and V1 and V2 are between 0.3 and 80 µg/m³.

12. The process as claimed in claim 10, wherein the purifier comprises
   a filtering media having a photocatalytic action,
   a system for illuminating said media with UV radiation,
   a time-delay means or a volatile organic compound analyzer, and
   a means for automatically adjusting the speed of the gas passing through the media or for adjusting the intensity of the UV illumination, said adjusting being carried out as a function of the time determined by the time-delay means or as a function of the content of a volatile organic compound analyzed by the analyzer.

13. A process for purifying gas comprising controlling the speed of the gas passing through a purifier comprising a filtering media having a photocatalytic action, a system for illuminating said media with UV radiation and a time-delay means controlling a moderate or greater capacity of the purifier, wherein the time-delay means controls the speed of the gas passing through the purifier.

14. A method for purifying the air of a workshop for the manufacture of fragrance or of a distillery comprising passing the air through a gas purifier as claimed in claim 1.

15. A method for purifying the air of a warehouse or of a refrigerator containing a fruit or a vegetable or a flower comprising passing the air through a gas purifier as claimed in claim 1.

16. A process for purifying gas passing through a purifier comprising a filtering media having a photocatalytic action, a lamp for illuminating said media with UV radiation and a time-delay means controlling a moderate or greater capacity of the purifier comprising controlling the speed of the gas passing through the filtering media and/or controlling the intensity of the UV illumination delivered by the lamp, wherein the time-delay means controls the speed of the gas passing through the purifier and/or the intensity of the UV illumination delivered by the lamp.

17. The process as claimed in claim 16, wherein the speed of the gas passing through the filtering media is controlled by the time-delay means.

18. The process as claimed in claim 16, wherein the intensity of the UV illumination delivered by the lamp is controlled by the time-delay means.

* * * * *